(12) United States Patent
Hindawi et al.

(10) Patent No.: US 7,398,272 B2
(45) Date of Patent: Jul. 8, 2008

(54) ENTERPRISE CONSOLE

(75) Inventors: David Salim Hindawi, Berkeley, CA (US); David Leigh Donoho, Stanford, CA (US); Lisa Ellen Lippincott, Berkeley, CA (US); Dennis S. Goodrow, Santa Rosa, CA (US); James Milton Brown, Novato, CA (US); Peter Lincroft, Berkeley, CA (US); Peter Benjamin Loer, Oakland, CA (US); Orion Yosef Hindawi, Berkeley, CA (US)

(73) Assignee: Bigfix, Inc., Emeryville, CA (US)

( * ) Notice: Subject to any disclaimer, the term of this patent is extended or adjusted under 35 U.S.C. 154(b) by 462 days.

(21) Appl. No.: 10/804,799

(22) Filed: Mar. 19, 2004

(65) Prior Publication Data

US 2005/0086534 A1    Apr. 21, 2005

Related U.S. Application Data

(60) Provisional application No. 60/457,480, filed on Mar. 24, 2003.

(51) Int. Cl.
    *G06F 17/30* (2006.01)
(52) U.S. Cl. .................. 707/10; 707/5; 709/203
(58) Field of Classification Search .............. 707/10, 707/104.1, 5; 709/203
    See application file for complete search history.

(56) References Cited

U.S. PATENT DOCUMENTS

| | | | |
|---|---|---|---|
| 5,586,304 A | 12/1996 | Stupek, Jr. et al. | |
| 6,161,218 A | 12/2000 | Taylor | |
| 6,237,144 B1 | 5/2001 | Delo | |
| 6,240,394 B1 * | 5/2001 | Uecker et al. | 705/3 |
| 6,240,451 B1 | 5/2001 | Campbell et al. | |
| 6,256,668 B1 | 7/2001 | Slivka et al. | |
| 6,289,510 B1 | 9/2001 | Nakajima | |
| 6,321,258 B1 | 11/2001 | Stollfus et al. | |
| 6,324,691 B1 | 11/2001 | Gazdik | |
| 6,324,693 B1 | 11/2001 | Brodersen et al. | |
| 6,327,617 B1 | 12/2001 | Fawcett | |
| 6,330,715 B1 | 12/2001 | Razzaghe-Ashrafi | |
| 6,345,386 B1 | 2/2002 | Delo et al. | |
| 6,347,396 B1 | 2/2002 | Gard | |
| 6,347,398 B1 | 2/2002 | Parthasarathy et al. | |
| 6,353,926 B1 | 3/2002 | Parthesarathy et al. | |
| 6,353,928 B1 | 3/2002 | Altberg et al. | |
| 6,360,366 B1 | 3/2002 | Heath et al. | |
| 6,378,128 B1 | 4/2002 | Edelstein et al. | |

(Continued)

*Primary Examiner*—Cheryl Lewis
(74) *Attorney, Agent, or Firm*—Michael A. Glenn; Glenn Patent Group

(57) ABSTRACT

A console for an enterprise suite is disclosed. The enterprise suite addresses the increasingly complex problem of keeping critical systems updated, compatible, and free of security holes. It uses Fixlet® technology to identify vulnerable computers on the network and then allows authorized personnel to correct problems across any subset of the network with a few simple mouse-clicks. The enterprise suite helps keep the networked computers updated and properly patched, all from a central console which, along with supporting architectural enhancements, is the subject matter of this document. The invention allows rolling out a security patch in minutes instead of months, thus allowing an administrator to stay ahead of potential hacker attacks. The invention also makes it possible to track the progress of each computer as updates are applied, thus making it simple to gauge the level of compliance across the entire enterprise.

65 Claims, 8 Drawing Sheets

U.S. PATENT DOCUMENTS

| | | |
|---|---|---|
| 6,381,742 B2 | 4/2002 | Forbes et al. |
| 6,389,589 B1 | 5/2002 | Mishra et al. |
| 6,418,554 B1 | 7/2002 | Delo et al. |
| 6,449,642 B2 | 9/2002 | Bourke-Dunphy et al. |
| 6,460,175 B1 | 10/2002 | Ferr et al. |
| 6,493,594 B1 | 12/2002 | Kraml |
| 6,496,977 B1 | 12/2002 | Hamilton, II et al. |
| 6,523,166 B1 | 2/2003 | Mishra et al. |
| 6,532,491 B1 | 3/2003 | Lakis et al. |
| 6,557,054 B2 | 4/2003 | Reisman |
| 6,564,369 B1 | 5/2003 | Hove et al. |
| 6,594,692 B1 | 7/2003 | Rolsman |
| 6,594,759 B1 | 7/2003 | Wang |
| 6,611,862 B2 | 8/2003 | Reisman |
| 6,654,714 B1 | 11/2003 | Gentile et al. |
| 6,658,464 B2 | 12/2003 | Reisman |
| 6,658,489 B1 | 12/2003 | Asselin |
| 6,725,242 B2 | 4/2004 | Gardner |
| 6,725,452 B1 | 4/2004 | Te'eni et al. |
| 6,735,766 B1 | 5/2004 | Chamberlain et al. |
| 6,745,766 B2 | 6/2004 | Fini |
| 6,769,009 B1 | 7/2004 | Reisman |
| 6,789,255 B1 | 9/2004 | Pedrizetti et al. |
| 6,802,061 B1 | 10/2004 | Parthasarathy et al. |
| 6,804,663 B1 | 10/2004 | Delo |
| 6,836,794 B1 | 12/2004 | Lucovsky et al. |
| 6,904,457 B2 | 6/2005 | Goodman |
| 6,920,631 B2 | 7/2005 | Delo |
| 6,922,831 B1 | 7/2005 | Kroening et al. |
| 6,941,453 B2 | 9/2005 | Rao |
| 6,971,094 B1 | 11/2005 | Ly |
| 6,996,815 B2 | 2/2006 | Bourke-Dunphy et al. |
| 6,996,819 B1 | 2/2006 | Alanis |
| 2001/0032091 A1* | 10/2001 | Schultz et al. ............... 705/1 |
| 2003/0033396 A1* | 2/2003 | McCall ..................... 709/223 |

* cited by examiner

ENTERPRISE CONSOLE

CROSS REFERENCE TO RELATED APPLICATIONS

This application claims priority to U.S. Provisional Patent Application Ser. No. 60/457,480, filed Mar. 24, 2003, which application is incorporated herein in its entirety by this reference thereto.

BACKGROUND OF THE INVENTION

1. Technical Field

The invention relates to the network management technology. More particularly, the invention relates to an enterprise console for management of large-scale the networks of computational devices.

2. Description of the Prior Art

Information technology (IT) administrators in enterprises everywhere face a daunting task of managing the software and hardware on tens, hundreds, or thousands of machines in their domains. With so many incompatibilities, patches, and policy advisories announced daily, the task is much more than just acquisition and installation. Even simply keeping aware of all potentially problematic situations on hardware and software products used in an enterprise requires more than a full-time job. Dealing with those situations in response to user complaints adds still further taxing demands. Thus, it is required that IT managers must anticipate the situations which may soon arise in a specific enterprise and make plans to deal with those before they cause major problems. This creates an urgent need of a technique which enables the IT managers to understand the configuration of the hardware and software in a given intranet, to keep track of the policy advisories, updates, incompatibilities and patches relevant to the specific enterprise, and to match those policy advisories, updates, and patches with the specific equipment in the enterprise.

Donoho et al disclose in U.S. Pat. No. 6,256,664 a technique which enables a collection of computers and associated communications infrastructure to offer a new communications process. This process allows information providers to broadcast information to a population of information consumers. The information may be targeted to those consumers who have a precisely formulated need for the information. This targeting may be based on information which is inaccessible to other communications protocols because, for example, under other protocols the targeting requires each potential recipient to reveal sensitive information, or under other protocols the targeting requires each potential recipient to reveal information obtainable after extensive calculations using data available only upon intimate knowledge of the consumer computer, its contents, and local environment.

This process enables efficient solutions to a variety of problems in modern life, including the automated technical support of modern computers. In the technical support application, the disclosed invention allows a provider to reach precisely those specific computers in a large consumer population which exhibit a specific combination of hardware, software, system settings, data, and local environment, and to offer the users of those computers appropriate remedies to correct problems known to affect computers in such situations.

FIG. 1 is a schematic block diagram illustrating a communications system for computed relevant messaging according to the prior art. A user directs an advice reader running on his computer 101 to subscribe to three advice provider sites 103-105. The corresponding advice is brought into his computer in the form of digital documents, where the advice reader inspects the advisories for relevance. These digital documents are called advisories. The transfer from Internet 102 to computer is entirely one-way. No information about the user's machine goes back to the advice provider. An advice typically comprises three parts: (1) a relevance clause written in relevance language which is evaluated by the advice reader to determine the relevance of the advice; (2) a message body for providing explanatory material explaining to an advice consumer as to what condition is relevant, why the advice consumer is concerned, and what action is recommended; and (3) an action button for providing the advice consumer with the ability to invoke an automatic execution of a recommended action.

Whereas in the consumer setting it is acceptable for the computer user to be in control of the process, learning which problems exist and applying the fixes, in the enterprise setting it is often the case that end user administration of computers is frowned upon. Instead, computers are often managed centrally, and a system administrator is in charge of keeping configurations workable and avoiding enterprise-wide problems.

What is desired is a technique that provides centralized advice management in a large-scale the network of computers.

What is further desired is that such technique provides a management interface that can display relevant advisories of all computers in the network and deploy suggested actions to all relevant computers.

What is still further desired is that such management interface allows a system administrator to manage subscription of advice provider sites, monitor status of deployed actions and monitor status of computers in the network.

What is still further desired is that such technique can automatically apply the required management tasks to fix problems on susceptible machines before they occur.

Commonly assigned PCT application no. PCT/US02/36644, which application is incorporated herein in its entirety by this reference thereto, discloses a system and method for centralized advice management of large-scale the networks, wherein a number of distributed clients run on registered computers, gathering advisories and report relevance to a central server. A system administrator may view the relevant messages through a management interface and deploy suggested actions to distributed clients where the actions are executed to apply the solutions of the advisories.

In a preferred embodiment, a centralized advice management system includes a plurality of distributed clients, a central server, a central database, and a management interface. The distributed clients gather advisories from a plurality of advice provider sites and report relevance of advisories to the central server. A system administrator may view the details of relevant advisories and deploy the suggested actions to distributed clients of relevant computers, where the actions are executed to apply solutions provided by the advisories.

In another equally preferred embodiment, a centralized advice management system includes a plurality of distributed clients, a mirror server, a central server, a central database, and a management interface.

In another equally preferred embodiment, a centralized advice management system having a distributed client is provided, in which the distributed client comprises various components performing functions such as gathering advisories, authenticating advisories, evaluating relevance of advisories, registering a computer to a central server, reporting relevance to the central server, listening messages from the central server, gathering deployed actions from the central server, and executing deployed actions.

In another equally preferred embodiment, a method for providing centralized advice management for large-scale computer the networks is disclosed that comprises the steps of:

The distributed clients on the computers register to a central server;

A system administrator subscribes registered computers to advice provider sites;

The distributed clients gather advisories from subscribed advice provider sites;

The distributed clients report relevance to the central server;

The system administrator views relevant advisories using a management interface;

The system administrator deploys actions suggested by the advisories to the distributed clients; and The distributed clients execute the deployed actions to apply the solutions of the advisories.

The method may further comprise a step to manage subscription of advice provider sites to the distributed clients. It may further comprise a step to monitor the status of deployed actions. Alternatively, it may further comprise a step to monitor the status of registered computers.

It would be advantageous to provide an enterprise console by which such system is used to identify vulnerable computers on the network, and that then allows authorized personnel to correct problems across any subset of the network with a few simple mouse-clicks.

SUMMARY OF THE INVENTION

The presently preferred embodiment of the invention comprises a console for an enterprise suite. The enterprise suite addresses the increasingly complex problem of keeping critical systems updated, compatible, and free of security holes. It uses Fixlet® technology to identify vulnerable computers on the network and then allows authorized personnel to correct problems across any subset of the network with a few simple mouse-clicks. The enterprise suite helps keep the networked computers updated and properly patched, all from a central console which, along with supporting architectural enhancements, is the subject matter of this document. The invention allows rolling out a security patch in minutes instead of months, thus allowing an administrator to stay ahead of potential hacker attacks. The invention also makes it possible to track the progress of each computer as updates are applied, thus making it simple to gauge the level of compliance across the entire enterprise.

DETAILED DESCRIPTION OF THE INVENTION

Figure 1:
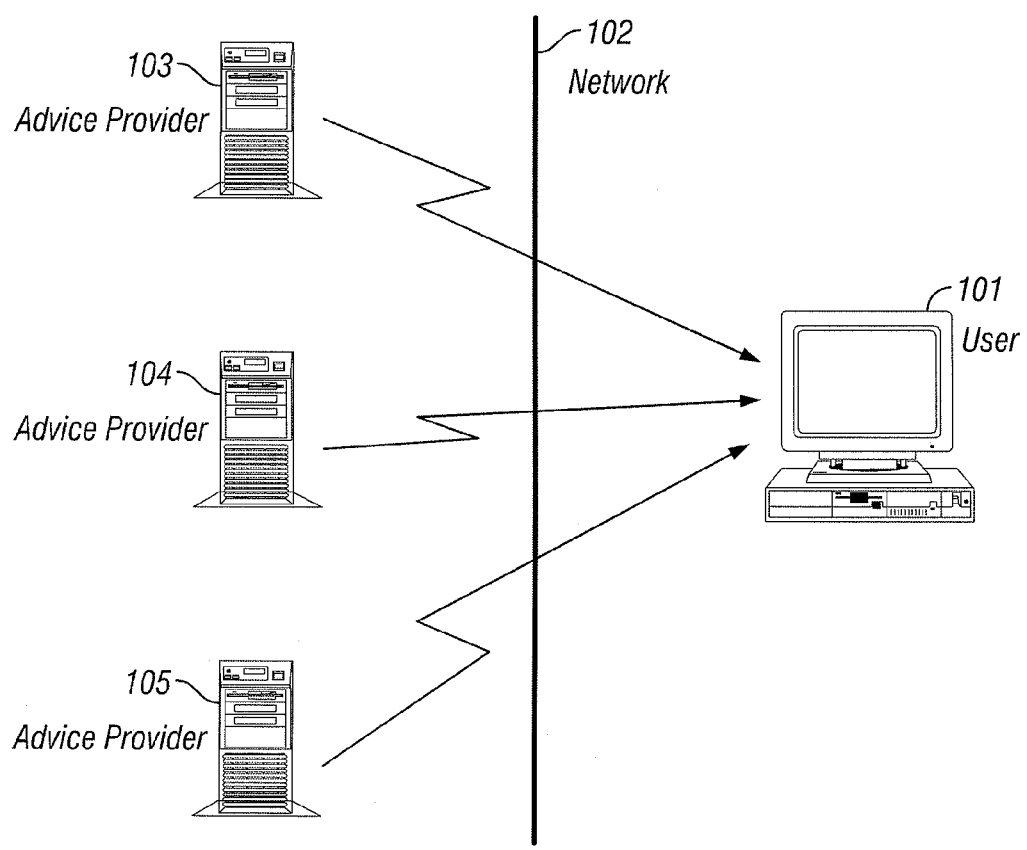
FIG. 1 is a schematic block diagram illustrating a communications system for computed relevant messaging according to the prior art.

Glossary action password—See signing password.

Action Scripting Language—The language used for crafting action scripts. Action can be crafted in different scripting languages, including AppleScript and Unix shells.

Client—Software installed on each the networked computer to be managed under. The Client accesses a pool of Fixlet messages, checks the computer it is installed on for vulnerabilities, and sends the Server a message when such a condition occurs.

Console—A management program that provides an overview of the status of all the computers with the Client installed in the network, identifying which might be vulnerable and offering corrective actions.

database—A component of the system that stores data about individual computers and Fixlet messages. The Server's interactions primarily affect this database, which is a standard Microsoft product (MSDE 2000 or SQL Server 2000).

Development Environment—An integrated system for authoring and deploying, or publishing, Fixlet messages.

Enterprise Suite—A preventive maintenance tool for enterprises that monitors computers across the networks to find and correct vulnerabilities with a few simple mouse-clicks.

Fixlet message—A mechanism for targeting and describing a problematic situation on a computer and providing an automatic fix for it.

Fixlet servers—Web servers offering Fixlet site subscriptions. They can be either internal to the enterprise the network or external to the network (if direct external We b access is allowed).

Fixlet site—A trusted source from which the Client obtains Fixlet messages.

Generator Install folder—The directory on the installation computer where the Generator places the installation files for the system.

IIS—See Internet Information Services.

installation computer—A secure computer (separate from the Server computer) that hosts and runs the Installation Generator.

Installation Generator—An application that creates installers for the core system components.

Internet Information Services (IIS)—is optimized to be used with a Windows 2000 Server computer running IIS.

Management Rights—Ordinary Console Operators can be limited to a specified group of computers. These limits represent the management rights for that user. Only a Site Administrator or a Master Operator can assign management rights.

Master Operator—A Console Operator with administrative rights. A Master Operator can do almost everything a Site Administrator can do, with the exception of creating new operators.

masthead—Files containing the parameters of the process, including URLs that point to where trusted Fixlet content is available. The Client brings content into the enterprise based on subscribed mastheads.

Microsoft Data Engine (MSDE)—A database engine that's included as part of the system and is useful for all the reporting and data storage needs. Sufficient for many needs, but may be upgraded to a full SQL implementation on larger the networks.

Mirror server—A server required in the system if the enterprise does not allow direct Web access but instead uses a proxy server that requires password-level authentication.

MSDE—See Microsoft Data Engine.

Operator—A person who operates the Console. Ordinary operators can deploy Fixlet actions and edit certain computer settings. Master Operators have extra privileges, among them the ability to assign management rights to other operators.

Relay—This is a Client (Win 2k, 2k3 or XP) that is running special server software. Relays spare server and the network by minimizing direct server-client downloads and by compressing upstream data. Relays are automatically discovered by Clients, which dynamically choose the Relay to connect to.

Relevance Language—The language in which relevance clauses are written.

Server—A collection of interacting applications (Web server, CGI-BIN, and database server) that coordinates the relay of information to and from individual computers in the system. The server processes may be hosted by a single server computer or segmented to run on separate server computers.

signing password—The password (specified when the system was installed) used by a Console operator to sign an action for deployment. It is called the action password in the Console interface.

Site Administrator—The person in charge of installing and authorizing Console operators.

SQL server—A full-scale database engine from Microsoft that can be acquired and installed into the system to satisfy more than the basic reporting and data storage needs. A step up from MSDE.

standard deployment—A deployment of that applies to workgroups and to enterprises with a single administrative domain. It is intended for a setting in which all Client computers have direct access to a single internal server.

system install folder—The directory on the Server where the Server and related files (including Console and Client installers) are installed.

system technology—A process that enables knowledgeable computer technicians to disseminate information about the causes of computer problems to Clients across the network and provide automatic solutions for them.

Throttling—A technique to limit bandwidth to accommodate shared users or thin connections.

VPN—Virtual Private The network. An encrypted channel (or tunnel) that allows companies to extend their local-area networks across the world by using an inexpensive Internet connection.

Web Reports—These reports can be collected from various Servers, providing a way to centrally administer a set of separate the networks.

Discussion

The Enterprise Suite solves the increasingly complex problem of keeping critical systems updated, compatible and free of security holes. It uses patented Fixlet® technology to identify vulnerable computers on the network and then allows authorized personnel to correct problems across any subset of the network with a few simple mouse-clicks (see U.S. Pat. No. 6,604,130, Donoho, et al., issued Aug. 5, 2003 for Relevance clause for computed relevance messaging, U.S. Pat. No. 6,356,936, Donoho, et al., issued Mar. 12, 2002 for Relevance clause for computed relevance messaging; U.S. Pat. No. 6,263,362, Donoho, et al., issued Jul. 17, 2001 for Inspector for computed relevance messaging; and U.S. Pat. No. 6,256,664, Donoho, et al., issued Jul. 3, 2001 for Method and apparatus for computed relevance messaging, each of which is incorporated herein in its entirety by this reference thereto). It is easy to keep the networked computers updated and properly patched, all from a central Console. Rolling out a security patch can be accomplished in minutes instead of months, allowing a user to stay ahead of potential hacker attacks, viruses and worms. One is able to track the progress of each computer as updates and patches are applied, making it simple to gauge the level of compliance across the entire enterprise. In addition, the invention keeps a running history of all remedial actions, providing a detailed audit trail for every Fixlet action and every patched computer on the network.

A Typical Installation

Figure 2:
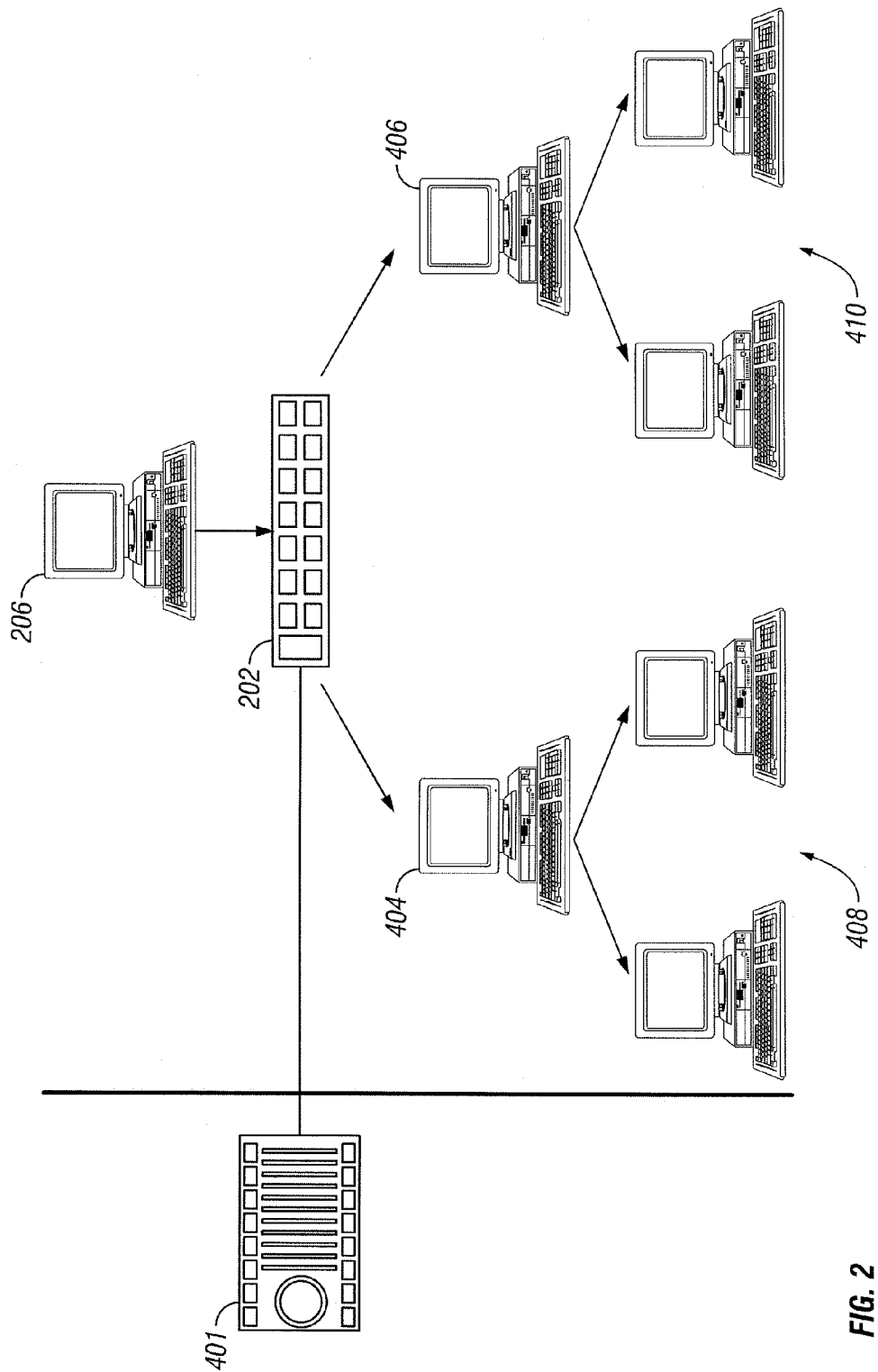
FIG. 2 is a block schematic diagram of a system comprising an enterprise console according to the invention.

A typical installation of 10,000 or fewer Clients is shown in FIG. 2. There is a single Server 202 that gathers Fixlet messages from a Fixlet site 401 on the Internet where they can be viewed by the Console 206 operator and distributed to the Relays 404, 406, which relay the data on to the Clients 408, 410. Each Client inspects its local computer and reports any relevant Fixlet messages back to the Relays, which compress the data and pass it back up to the servers. The Console oversees this activity. It connects to the Server and periodically updates its display to reflect changes or new knowledge about the network. When vulnerabilities are discovered, the Console operator can then target patches or other fixes to the appropriate computers. The progress of the fixes can be followed in near real-time as they spread to all the relevant computers and, one by one, eliminate bugs and vulnerabilities.

Overview of the System

The system has the following main components:

The Client is installed on every computer one wish to manage under. It accesses a collection of Fixlet messages that seek out security holes and other vulnerabilities. If a vulnerability is found, the Client can then implement corrective actions received from the Console. In most cases, the Client operates silently, without any direct intervention from the end user. However, should one need to solicit user response, it also allows one to provide screen prompts.

The Server is a collection of interacting applications—Web server, database server and CGI-BIN programs—that lies at the heart of the system. It coordinates the flow of information to and from individual Clients and stores the results in the database.

The Relay is an optional component that increases the efficiency of the system. Instead of letting every the networked computer directly access the Server, relays can be used to offload much of the burden. Dozens of Clients can point to a Relay for downloads, which in turn makes only a single request of the server. Relays can connect to other relays as well, further increasing the efficiency. They can also automate the relay setup, dynamically determining the configuration for the current state of the network.

The Console ties all these components together to provide a system-wide view of the networked computers, along with their vulnerabilities and suggested remedies. As an authorized user, the Console allows one to quickly and simply distribute a fix to exactly those computers that need it—with zero impact on the rest of the network. The Console can be run on any computer that has the network access to the Server.

Web Reports let one produce charts and graphs of data, providing one with hard copy and helping one to maintain an audit trail of all the Fixlet activity on the network. It allows one to export this data for further manipulation in a spread sheet or database. The Web Reports program also allows one to aggregate information from additional Servers that one may have installed in the organization. This important feature allows an organization with hundreds of thousands of computers to be quickly and easily visualized.

Introducing the Console

The Main Console window (see FIG. 3) for the Enterprise Suite has an upper panel with four main tabs 301 and a document window below that to expand upon each of these four key elements of the system. The way to operate the Console is to click on one of the four tabs and then double-click on an item from the resulting list. That opens a document in the bottom window with more detailed information about the selected item.

Main Tabs

Fixlet Messages: Displays a list of Fixlet messages that are relevant on the various Client computers on the network.

Computers: Displays a list of the Client computers on the network, along with several useful properties retrieved from those computers.

Actions: Displays a list of the Actions that have been or are currently running across the network. Console Operators: Displays a list of authorized Console operators.

Filter Panel: The filter panel 302 provides a set of folders that contains specific field values that one can use to narrow down the list panel on the right. For instance, after clicking the Fixlet Messages tab, one might open the Source Severity folder and select Critical to filter the list down to critical Fixlet messages only.

List Panel: The list panel 300 provides a listing, as filtered by the filter panel (above). One can sort the list by clicking on the column headers. One can also rearrange the headers by dragging them left or right. There may be a pop-up menu when one right-click on one of the headers. If so, it contains a list of all the possible fields for one to select or deselect at will.

Right-click Menu: The right-click menu 303 is the context menu that shows up when one right-clicks on any item in a list. Each different list has a unique context menu.

Document Area: Below the tabbed area is a document window. When one double-clicks on an item from any list, it opens a detailed document in this area.

Document tabs: Each type of document has a unique set of document tabs 305 to go along with it.

Fixlet Message: If a Fixlet message 304 is opened from the list, the Fixlet document explains the issue in plain English.

Action Button: A Fixlet document typically contains at least one Action, represented by a link or button 310. Click it to deploy the action across the network.

Figure 3:
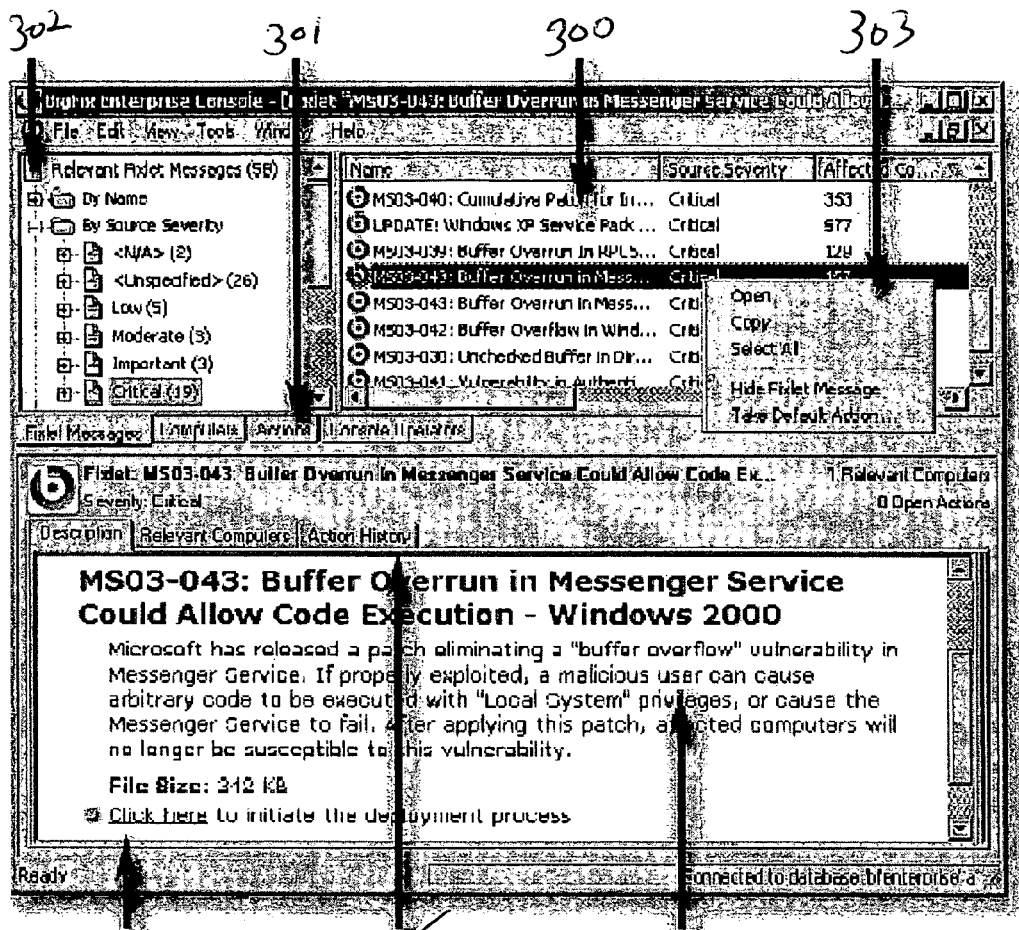
FIG. 3 is a screen shot showing an enterprise console window during a typical session according to the invention.

FIG. 3 is a screen shot from a typical session.

The Fixlet Messages tab is selected, and the user is viewing a message opened from the list panel: In general, the Console operator views the list of Fixlet messages, opens each one and sees what the issues are. Each Fixlet message describes a problem that has been discovered on some Client. The Fixlet document in the bottom panel presents one with a short, dear explanation of the problem. If one wishes, one can inspect the actual code used in the Relevance Expressions and the proposed actions.

Once one decides to deploy the action to the relevant computers, just click on the action (represented by a button or a hyperlink in the Fixlet Window) and follow the prompts. After deploying the action, the affected Clients are fixed and no longer report the problem, so the Fixlet disappears.

One can set preferences that govern how responsive and secure one want s Fixlet the network to be. To change the default values, select Preferences from the File menu.

Operating Basics

The Enterprise Suite is a powerful and feature-packed program that may seem overwhelming to a new user. Fortunately, once one masters the typical workflow, the operation becomes straightforward and intuitive. Let's run through a sample session:

1. Start up the Console.
2. Click the tab labeled Fixlet Messages. One sees two panels, side by side (see FIG. 4): The left panel offers a way to filter the list in the right panel which, in turn, displays all the issues that are relevant to the network of computers.
3. Open up a folder in the filter panel (on the left) and select a filter. For instance, open the Source Severity folder and click on Critical. The list to the right is now filtered to display only critical Fixlet messages.
4. In the right panel, double-click on a Fixlet message of interest. A document opens up in the lower panel (see FIG. 5). This is the text of the Fixlet message. Read the message. Typically, one wants to deploy the action recommended by the Fixlet message, but it is always wise to read about the issue first.
5. At the bottom of the message one finds one or more links that initiate actions to fix the afflicted computers. Click on the action that seems most appropriate. A Take Action dialog box opens (see FIG. 6).
6. Use the target tab to select the computers one wishes to target. One can simply select the computers one wants from the list, which contains all those computers for which the Fixlet message is currently relevant. This technique limits the Fixlet action to this hardwired list. Or, one can select the second button, which allows one to take actions on any computers that are currently relevant or become relevant in the future. Both options allow one to filter this group of computers by their retrieved properties.
7. Use the rest of the tabs to prepare action, including user messages, constraints and scheduling, then click the OK button.
8. The Fixlet action is now deployed throughout the network, and are applied only to those computers that need it.

This is the workflow that one uses for typical computer maintenance and remediation. As one explores the interface, one discovers that the invention can also help one inventory computers, manage users and maintain a detailed history of every patch and upgrade. In each case, one starts with the top panel, uses the left panel to filter the list and then finds further information in the bottom panel. With this simple overview, one is ready to maintain the network in prime operating condition with a minimum of fuss.

Viewing Fixlet Messages

To display a Fixlet message,

Double-click an entry in any Fixlet list

The body of the Fixlet message shows up in the lower display region (click the Description tab if not already selected). All of the Fixlet messages (as well as computers, actions and operators), when selected, get windows of their own, which can be managed by selecting items from the Window menu.

The Fixlet display region has three tabs:

Description: typically a rendered HTML (Web) page providing a descriptive explanation of the problem and an action to fix it. This window also includes the Fixlet Message Properties, a panel detailing the code behind the Relevance expressions and the Fixlet actions, along with other Fixlet properties. By default the properties window is turned off. One can turn it on by selecting View>Show Fixlet Message Properties. The message body usually has the following elements:

Graphic elements associated with the specific Fixlet site.

Descriptive content explaining the problem.

Hyperlinks that specify actions to be taken by the Clients.

Hyperlinks that affect the Console or offer metadata about the site or the problem.

Relevant Computers: This is a filter/list of all the computers targeted by the selected Fixlet message. One can filter the list by selecting items from the folders on the left, and sort the list by clicking on the column headers.

Action History: This is a filter/list of any actions that have been deployed from this Fixlet message. If the Fixlet message is new, there won't be any actions in the list. As with the other filter/lists in the Console, one can filter the actions using the left panel, and sort them by clicking the column headers.

Monitoring Fixlet Messages

When Fixlet messages become relevant somewhere on the network, the invention adds them to the list of Fixlet messages to be displayed under the Fixlet Messages tab in the Console main window. The Fixlet filter/list contains entries that include the following information:

Name: The name assigned to the Fixlet message by the author.

Source Severity: A measure of how serious a Fixlet message is, assigned by the Fixlet author. Typical values are Critical, Important, Moderate or Low.

ID: A numerical ID assigned to the Fixlet message by the author.

Site: The name of the site that is generating the relevant Fixlet message.

Affected Computer Count: The number of Clients in the network currently affected by the Fixlet message.

Unlocked Computer Count: The number of unlocked computers affected by this Fixlet message.

Open Action Count: Number of distinct actions open for the given Fixlet message.

Category: The type of Fixlet message, such as a security patch or update.

Download Size: The size of the remedial file or patch that the action downloads.

Source: The name of the source company that provided the Fixlet information.

Source ID: An ID number for the source.

Source Release Date: The date this Fixlet message was released.

As with all the filter/lists in the Console, one can filter this list using the panel of folders on the left. Each folder contains data groupings that one can use to narrow down the list of Fixlet messages on the right. Then, in the listing area itself, one can sort the Fixlet messages by clicking a column heading. For example, one might filter the list by opening the Source Severity folder and selecting Critical to filter out non-critical Fixlet messages. Then one could sort the Fixlet messages by Affected Computer Count (which shows the number of affected computers) to find which Fixlet messages are relevant to the greatest number of computers. If one does not see one of the columns listed above, right-click in the Fixlet header and select it from the pop-up menu.

Commenting on a Fixlet Message

Some Fixlet Sites contain, as part of the Site design, a link or button that says Comments. This link is designed to provide feedback to the Fixlet author.

1. Find and display a Fixlet message with a "Comment on this Fixlet" link.
2. Click the link. The Fixlet display window browses to a URL, usually to send e-mail or fill out a Web form containing feedback.
3. Type comments, then send or submit them to the Fixlet author.

Hiding Fixlet Messages

One can hide a Fixlet message with the following procedure:

1. From any Fixlet list, select the Fixlet message one want to hide.
2. Right-click on the Fixlet message and select Hide Fixlet from the pop-up menu (or select Hide Fixlet Message from the Edit menu).

The hidden Fixlet message is no longer displayed in the Fixlet list. In addition, some Fixlet sites contain, as part of the site design, a link that says Hide Fixlet Message. Here's what to do:

1. Find and display a Fixlet message with a Hide Fixlet Message link or button.
2. Click on the link or button.

Generally speaking, it is not necessary to hide Fixlet messages, as one can simply ignore them. The main reason for hiding a Fixlet message is if one feels that the message is not relevant to the network and could never be useful and one wants to avoid viewing the message every time one launches the Console.

One can see a list of the hidden Fixlet messages by selecting View>Hidden Fixlets. From this panel, one can also restore or "unhide" a Fixlet message by selecting it and clicking the Restore Fixlet button.

Introducing Relevance

To inspect various aspects of a computer quickly, the Relevance Language was developed. This human-readable language allows Fixlet authors to target actions to just those computers that need the fix and no others. Thus one can feel confident that only broken machines are being fixed and that the rest are never bothered.

The Relevance Language can query an exhaustive set of computer properties, and it is designed for speed. Most Console operators rely on third parties to write Fixlet messages, and so their exposure to the Relevance Language is not critical to operating the Console. However, the Console can be customized with short lines of code from the Relevance Language (called Relevance Expressions) which allow an unprecedented amount of control over the Client computers on the network.

A typical Relevance Expression might be vendor name of processor

This expression returns the name of the manufacturer of the CPU (which may be Intel, for instance), which can then be used to determine relevance. One can use Relevance Expressions to create retrieved properties which one can use to organize and filter the Clients on the network. For example, Table 1 below shows some possible properties that might be useful to know about Client computers.

TABLE 1

Client Computer Properties

| Property name | Relevance Expression | Result |
|---|---|---|
| Pentium | family name of main processor contains "Pentium" | True if the processor is a Pentium. |
| Small drive | Total space of drive "c:" < 2000000000 | True if the drive is smaller than 2 GB. |
| Bad clock | absolute value (now − apparent registration server time) > 1 hour | True if the clock is off by more than one hour. |
| IE Version | file version of application "iexplore.exe" of the registry | Version number of Internet Explorer. |
| Mailto App | application of key "HKEY_CLASSES_ROOT\mailto" of the registry | the name of the app that handles mailto requests from a browser. |
| Running Word | exists running application whose (name of it as lowercase is "winword.exe") | True if Word is running on the BES Client computer. |
| Bios date | date of Bios | BIOS date, if it exists. |
| Processors | number of processors | The total number of processors in the BES Client computer. |

Use the Retrieved Properties dialog to see how these custom properties work. Click the Add New button, supply the property name, and type in the Relevance Expression in the text box. There are literally thousands of useful Retrieved Properties—far too many to list here.

Viewing Relevance Expressions

When a Fixlet message becomes relevant to some computer on the network, one may want to know exactly what triggered it. One may also want to scrutinize the specifics of the suggested action. One can, because these items are written in the Relevance Language, which is a human-readable language for probing and acting on computers.

To view these Relevance Expressions:
1. Double-click on a Fixlet message from any list to bring up a detailed Fixlet document in the bottom window.
2. Select the Description tab.
3. Choose View>Fixlet Message Properties.

This opens a new panel with two main areas to display the "brains" behind the Fixlet message:
- the relevance clauses: One or more boxes listing the relevance Expressions that are used to determine the relevance of this Fixlet message.
- The action scripts: One or more boxes showing the code that are executed if an action is selected.

NOTE: This window is always accessible, but it may be minimized. To open it, grab the vertical divider at the right of the screen and drag it left.

Deploying the Action

At the heart of the system is the ability to deploy actions to fix one or many computers. Here's how:
1. Open a Fixlet message from any Fixlet list by double-clicking it. Read the text carefully, and research the action.
2. Click the link or button corresponding to the Fixlet action. The Take Action dialog box appears.
3. If one wishes, one can fine-tune the list of targeted computers using the Target tab. Use the computer tree in the left panel to filter the list in the right panel.
4. Create an optional message to show up on Client computers using the Message tab.
5. Set the various scheduling parameters with the Constraints and Execution tabs.
6. Click the OK button at the bottom of the Take Action dialog box. One are asked for password authentication.
7. Enter the authentication password and click OK.

The action are sent to all the computers targeted in the Take Action dialog. Once the action has executed and the targeted computers are fixed, those computers should no longer report this Fixlet message as relevant.

Monitoring Actions

When one agrees to take a proposed action he is given several options concerning its deployment—for example, one might schedule the action to take place unattended, after midnight, or to take place explicitly with computer user involvement during the day. After actions have been scheduled, the Server attempts to signal individual computers that actions are waiting for them. Ideally, the Client gathers the action information from the action site and carries it out immediately. More typically however, some computers are powered off and others are mobile and undocked at the time of the deployment. As soon as these computers are powered on or docked to the network, the remedial actions are applied to them as well. The Console lets one monitor the entire rollout, from start to finish.

Click the Actions tab in the main Console window, then double-click on an action to view its status, whether evaluating, pending, running, fixed, or failed.

Stopping an Action

Should one ever find it necessary to stop execution of an action that's already been deployed but hasn't finished running yet, follow these steps:
1. Click on the Actions tab in the main screen. This brings up a filter/list panel of all current and previous actions. One can filter or sort them by State or Time Issued to help one find the action one want to stop.
2. Right-click on the action and choose Stop Action from the pop-up menu. (Or select Stop Action from the Edit menu). This removes the action from the Server, which—subject to details of a given computer's the network connectivity and gather frequency—quickly terminates the action on each computer in the system.

If one wants to modify an action that's been deployed but hasn't finished running, one must first stop the action as described and then start a new action with the desired characteristics. There is no way to modify the targeting or scheduling of an action once the deployment is initiated.

Restarting an Action

If one has stopped an action before it finished, one can start it up again with this command:
Select Restart Action from the Edit menu.

This places the action back on the server, which then begins to target the action to the relevant machines.

Default Actions

Many Fixlet messages have a default action that can be applied automatically. This is a simple process:

Right-click on a Fixlet message and choose Take Default Action from the pop-up menu. Or click on a Fixlet message and select Edit>Take Default Action.

Often, a suite of related Fixlet messages becomes relevant all at once. If they each have default actions, one may be able to apply all of them with a single click:

1. Select (using shift- or ctrl-click) the set of Fixlet messages one want to apply.
2. Right-click on one of the highlighted Fixlet messages and choose Take Default Action from the pop-up menu.

Custom Actions

One can create custom actions to fix problems across the network that are not currently addressed by the standard content sources. Although the process is simple to describe, there are an infinite number of actions and targeting techniques that can be used. To create a custom action:

Log on to the Console as a Master Operator.
Select Tools>Take Custom Action.
The Take Action dialog pops up.
Click on the Action Script tab and type in an action script. For more information on the Action Script dialog, click here.
Click on the Relevance tab if one would like to fine-tune the targeting of an action script.
When one is ready to deploy a custom action, click OK. The custom actions are distributed to all the computers that have been selected or targeted.

The actions are applied using whatever constraints and schedules specified.

Managing Computers

Monitoring Computer Status

Although the invention is primarily a preventive maintenance tool, it can also be used to analyze the computers in the network. Using the Relevance Language, one can query any Client and get a real-time response. This can be invaluable for analyzing trends and potential problem areas on the network. To view the computers on the network:

1. Select the Computers tab in the top panel. One sees a filter/list of the networked Client computers, ready to be sorted and filtered by various computer properties.
2. Click on folder items (in the left panel) to filter the list, and/or click on the desired column headers (in the right panel) to sort the list. Click again to reverse the sort order.

The folder names and column headers represent important, continuously updated properties of the networked computers, called retrieved properties. To view the Relevance Expressions that define the column headers:

1. Select Define Retrieved Properties from the Tools menu. A dialog pops up, initially listing the default properties that come predefined in the system, such as OS, CPU, Computer Name and so on.
2. Click on a retrieved property. In the text box underneath, one can view the Relevance Expressions that are used to define this column. For example, the column heading CPU is generated by this Relevance Expression:

(significant digits 2 of (speed of main processor/MHz)) as string & "MHz" & family name of main processor That is, CPU is a concatenation of relevance expressions and strings that produces an output such as: 2800 MHz Pentium 4.

3. One may change the predefined properties here, but it is recommended that one add new column headings, instead.

If one changes any of the factory-installed properties, one can restore them by re-entering the original relevance expression. See Restoring Retrieved Properties. One can quickly select which properties to display by right-clicking on the column headers. A pop-up menu is displayed that allows one to check or uncheck the properties one wants to display. Notice that when one delete a property from the headers, it also disappears from the filter panel to the left of the list.

Creating Retrieved Properties

One can collect information from Clients by defining various retrieved properties. An impressive range of computer attributes can be monitored as retrieved properties. There are several reasons why one might want to create some custom retrieved properties of own:

Once one create a retrieved property it can be used as a filter in all subsequent computer listings, allowing one to tame datasets that are too large to visualize by filtering them into smaller viewable chunks.
Newly-created properties are added to the column headers of computer listings, allowing one to sort on their values.
Retrieved properties can be used to fine-tune the targeting of Fixlet actions.
Retrieved properties can also be used and charted in Web Reports. The preferred embodiment is provided with a predefined set of retrieved properties which are sufficient to group computers by many frequently requested criteria. There are times, however, when one may want even more control over how Clients are grouped and sorted.

To create a custom retrieved property, follow these steps:

1. Choose Tools>Define Retrieved Properties.
2. Click the Add New Button.
3. Type in the name of new retrieved property.
4. Create a Relevance Expression to evaluate. This can access hardware characteristics, registry.

entries and even data in specific files on the client computers. After one define the new column heading, the Clients automatically compute the value of the corresponding relevance expression and return it to the Database.

5. Click the OK button.

Note: Some of these properties are primarily aimed at Windows computers. Some properties do not work on certain versions of Windows and return a blank string. A blank string is also returned if more than one result is retrieved for a property.

Restoring Retrieved Properties

It is easy to customize the retrieved properties that are used as column headers in all the Console computer listings. Should one want to restore the predefined properties, do the following:

1. Visit the Website to select a property definition.
2. From the Console, choose Tools>Define Retrieved Properties.
3. Select an existing property to edit.
4. Using the data from the Website, re-enter the proper Relevance Expression into the edit box at the bottom of the dialog.

5. Click the OK button.

If one needs to add back a field that one inadvertently deleted:
1. Click on the Add New button.
2. Type in the name of the retrieved property.
3. Enter the relevance expression as outlined above.

Locking Computers

One can change the locked status of any Client in the network. This lets one exclude specific computers or groups of computers from the effects of Fixlet actions. This could be useful, for instance, if one wants to insulate certain development computers from any changes or updates. It also provides a powerful technique for testing new Fixlet actions on a limited set of unlocked computers, while keeping the rest of the network locked down. Client computers can be locked forever (until explicitly unlocked) or for a defined period of time.

Changes are made to the locked status of a Client by sending an action. As a consequence, the Console operator must supply proper authentication to lock or unlock any computer. Even though a Client is locked, there is still a subset of actions that can b e accepted by the client. These include clock changes and unlock actions as well as actions from the Support site. To lock or unlock a computer, follow these steps:
1. Click on the Computers tab to bring up the list of the networked Client computers.
2. Select the computer(s) that one wishes to lock.
3. Right-click and select Edit Computer Settings from the pop-up menu. (Or select Edit Computer Settings from the Edit menu).
4. The Edit Settings dialog pops up. Click the checkbox to either lock or unlock the computer.
5. If one are locking the computer, one may also set the expiration date and time. This automatically unlocks the Client at the specified time.

Assigning Management Rights

In a typical deployment, there may be thousands of computers sharing a centralized Fixlet database. If they are all administered by a single Console, there may be an overwhelming amount of information to view and the response rate may suffer.

A better way to organize the network of this size is to break it down into departments. Each department head can be assigned management rights to his own departmental computers. For even larger the networks, these departments can be broken down again. Because different managers can be assigned to overlapping groups of computers, any kind of configuration is possible. Managers only receive information from their assigned computers, dramatically improving responsiveness.

Here's how to grant or revoke management rights:
1. Log in to the Console as a Master Operator (one must have a properly-authorized user name created with the Administration Tool). If one does not have the proper authorization, one is not allowed to edit management rights.
2. Click on the Console Operators tab to bring up a filter/list of all authorized Operators. (If one does not have the proper authorization, this tab is not available).
3. Right-click on an operator and select Assign User Management Rights from the pop-up menu. (Or select Assign User Management Rights from the Edit menu).
4. From the dialog, one can grant specific management rights to the selected operator. Click the Add button, which brings up a computer filter.
5. Using retrieved properties as a filter, select the desired subset of computers one wishes to have administered by this Console operator, and click OK.
6. One can also revoke management rights using this dialog box. Simply click on the Delete button which brings up another computer filter. Select the computers one wants to remove from this operator's administration and click OK.
7. Click the OK button to finalize the setting.

Management rights are distributed as Fixlet actions, so one sees a brief Action Progress dialog as the new rights are deployed.

Removing Computers

To remove a computer from Administration, follow this procedure:
1. Click the Computers tab and select the computer one wishes to remove.
2. Right-click on the computer and select Remove Computer from the pop-up menu (or select Remove Computer from the Edit menu).

This computer is no longer under Administration, and is no longer be queried for vulnerabilities.

Managing Fixlet Sites

Selecting Sites

Upon installation, is automatically set up to subscribe to the Support Site. Depending on the terms of license, one may have subscriptions to other sites as well. This means that content from those Sites automatically flows into enterprise and are evaluated for relevance on all computers running the Client.

To subscribe to a site, follow these two steps:
1. First, find an appropriate Fixlet site. Finding a Fixlet site is equivalent to finding a Fixlet site Masthead file, which has an extension of .afxm, .efxm or .fxm. There are several ways to do this:
   Sites: may post links list to new Fixlet sites as they become available.
   Fixlet Subscriptions: Sometimes a Fixlet message might offer a subscription. Just click the Fixlet action to initiate the subscription.
   Download Mastheads: One can also subscribe to a Fixlet site by downloading a masthead file from a vendor's Web site. Once the masthead is saved to computer, one can activate it in one of two ways.
      Double-click the masthead.
      Select Manage Sites from the Tools menu and click Add Site. This brings up a standard Open File dialog. Navigate to the saved masthead and select it.
2. Once one selects a masthead, one is presented with a confirmation dialog. It provides one with information about the site. Click Yes to proceed.
3. One is prompted for private key password. Type it in and click OK.

The masthead is propagated to all Clients, which immediately begins to evaluate the Fixlet messages from the new site.

Viewing Site Properties

After initiating a subscription, one may want to inspect its properties and signing authorities. This can be useful when tracking down the origin of a particular Fixlet message or action. Here's how:
1. Choose Tools>Manage Sites. A dialog box pops up.
2. Select the desired site from the list.
3. Click the Properties button.

The Site Properties dialog box appears, detailing information about the site publisher and the precise URLs from which the content has been gathered. Among other things, this dialog box shows e-mail addresses for user feedback and the recommended gather frequency.

Canceling a Subscription

One can afford to be adventurous in trying out Fixlet Site subscriptions for organization, since Fixlet messages themselves place no perceptible burden on computers and since no actions on those computers are ever taken without approval. Nevertheless, if one finds that a subscription is not useful, one can cancel it by removing the Site from the list of subscriptions, as follows:
1. Choose Manage Sites from the Tools menu and, in the Manage Sites dialog box, one sees a list of current subscriptions.
2. Click the name of the Fixlet site one wants to remove.
3. Click the Remove Site button.

NOTE: one cannot unsubscribe from the Support site—it is needed to upgrade and manage licensing issues in the Console program.

Using Relays

Understanding Relays

Relays are optional the network components that can significantly improve the performance of installation. Downloads and patches, which are often large files, represent by far the greatest fraction of bandwidth. Relays are designed to take over the bulk of the download burden from the Server. Rather than downloading patches directly from a Server, Clients can instead be instructed to download from designated Relays, significantly reducing both server load and client/server the network traffic. Relays help in the upstream direction as well, compiling and compressing data received from the Clients before passing it on the Server. Any Windows 2000 or XP-based client can serve as a Relay.

A Relay simultaneously mitigates two bottlenecks:

Relieves the Load on Servers. The Server has many duties, among them the taxing job of distributing patches and other files. A Relay can be set up to ease this burden, so that the Server does not need to distribute the same files to every Client. Instead, the file is sent once to the Relay, which in turn distributes it to the other Clients. The overhead on the Server is reduced by the ratio of relays to clients. If one has a hundred Clients and one Relay, the Server would only need to process one percent of the downloads.

Reduces Congestion on Low-Bandwidth Connections. If one has a Server communicating with a dozen computers in a remote office over a slow VPN, designate one of those computers as a Relay. Then, instead of sending patches over the VPN to every Client independently, the Server only sends a single copy to the Relay. That Relay, in turn, distributes the file to the other computers in the remote office over its own fast LAN. This effectively removes the VPN bottleneck for remote groups on the network.

Note: Relays also work well to reduce total the network usage when used on subnets connected through switches on LAN.

Assigning Relays is simple, and Clients can be made to automatically discover and link to them. Automatic discovery is recommended because it insures optimal performance even while computers and relays are being disconnected and reconnected across the network.

Relay Requirements

A Relay takes over most of the download duties of the Server. If several Clients simultaneously request files from a Relay, a significant amount of the computer's resources may be used to serve those files. Other than that, the duties of the Relay are not too demanding. The requirements for a Relay computer vary widely depending on three main factors:

The number of connected Clients that are downloading files.

The size of each download.

The period of time allotted for the downloads.

The Relay system requirements are similar to those for a workgroup file server. A computer with 1 GHZ CPU, 256 MB RAM, and 5 GB of free space on the hard drive should be able to act as a Relay for several hundred to several thousand computers—provided that the Console operator distributes the file downloads over an appropriate length of time. Here are some further requirements and recommendations:

The Relay can only be installed on computers running under Windows 2000, 2k3 or XP.

The Relay can be installed on an ordinary workstation, but if several Clients simultaneously download files, it may slow the computer down.

Workgroup file servers and other server-quality computers that are always turned on are good candidates for installing a Relay.

Secondary Relays

Although Clients can automatically seek out and connect to the available relay, one may want to control the process manually. If so, for each Client in the network, one may specify both a primary and secondary relay (see FIG. 2). The Client first attempts to download any patches from its primary relay. However, if the primary Relay is unavailable (because the computer has crashed, the hard drive has run out of space, the computer is off, etc.), the Clients can download files from the secondary Relay.

Relays are failsafe. If the primary Relay fails, the secondary kicks in. If the secondary also fails (or no secondary has been designated) then the Clients automatically revert to downloading files directly from the Server. Although optional, it is recommended that whenever a Relay is created, a secondary Relay should be created as well. Here's a useful strategy for using the primary and secondary relays:

One can optimize a pair of Relays by splitting the connected Clients into two groups of roughly equal size. One group designates computer A as primary and B as secondary. The other group flips the order. That cuts the overhead of each Relay by two, while still providing a backup.

Setting Up A Relay

To set up a Relay, one needs to designate a Windows 2000, 2k3 or XP client computer to take over some server duties. Once a Relay has been set up, computers on the network can automatically find them and connect to them (or, if one need, one can manually assign Clients to point at specified relays).

This significantly reduces the client/server communication necessary for patch application and management. Clients start to download from these designated relays, minimizing the load on thin connections to the Server. The Clients also upload their status information to the Relay, which compiles it and compresses it before passing it on up to the server.

Relays help enormously to spread out and optimize the network traffic, ensuring maximum responsiveness with minimum bandwidth. Relays are especially attractive with remote offices connected by relatively slow VPNs. The Server sends a single download to the remote Relay, which can then distribute it to the Clients over a faster local subnet.

To configure a client computer as a Relay, follow these steps:
1. Click on the Computers tab in the main Window.
2. Right-click on a computer from the list to act as the Relay. From the pop-up menu, select Edit Computer Settings. (Or select Edit Computer Settings from the Edit menu).
3. Check the box marked Run relay server on this computer.
4. Click the OK button.

After the relay has been created, Clients can be made to automatically discover them and connect up to them, always seeking the Relay that is the fewest hops away. If need to manually configure Clients, one must notify each computer that it should use a specific relay to point to, as described in Using Relays.

Using Relays

Once one has set up a Relay one needs to direct Clients on the network to gather from that relay, instead of from the Server. This is actually a good job for a computer, and can automatically assign relays for one. This is a good idea for two reasons:

Clients can determine which relays are the fewest number of hops away, so topology is optimized.

The network configuration is constantly shifting as laptops dock and undock, as computers start up or shut down, or as new hardware is added or removed. Clients can dynamically assess configuration to maintain the most efficient connections as the network changes.

Automatic Relays

Here's how one can ensure that Client computers are automatically signing up to the nearest relays:
1. Click on the Computers tab to bring up a filter/list of Client computers.
2. Select the set of computers that one want to automatically connect to the optimal Relay.
3. Right-click the highlighted computers and select Edit Computer Settings from the pop-up menu.
4. Check the box labeled Relay Selection Method.
5. Select the button labeled Automatically Locate Relay.
6. Click the OK button.

Manually Assigning Multiple Clients

One can select all the computers (or any given subset) of the local net to gather from the relay. The procedure is different for setting a single computer or multiple computers. Here's how to set multiple computers:
1. Click on the Computers tab to bring up a filter/list of Client computers.
2. Select the set of computers that one want to connect to the Relay. Use the filter panel on the left to narrow down the computer list, if desired.
3. Right-click the highlighted computers and select Edit Computer Settings from the pop-up menu.
4. Check the box labeled Primary Relay.
5. Select the name of the desired Relay from the pull-down menu.
6. Click the OK button.

Manually Assigning Single Clients

Here's how to set a single computer to point to a relay:
1. Click on the Computers tab to bring up a filter/list of Client computers.
2. Right-click on the single computer that one want to connect to the Relay.
3. Select Edit Computer Settings from the pop-up menu.
4. Check the box labeled Assign Relays Manually.
5. From the Primary Relay pull-down menu, select the desired Relay.
6. Click the OK button.

Viewing Web Reports

Introducing Web Reports

The Web Reports can monitor, print or archive the status of the local database. It also has the ability to read the databases of other Servers and aggregate the data. That offers one a top-level view of a large or far-flung enterprise with multiple database servers. Aggregation servers allow one to view information from multiple the networks with hundreds of thousands of computers.

Web Reports can be viewed at any time from the desktop by selecting Start>Programs>Enterprise>Web Reports or from the Console under Tools>View Web Reports.

Any Web Report server can be set up to aggregate data from the other Servers.

Web Reports Overview

One can view the data in the database from several different points of view and save or print the output. One may also export the output to Excel for further manipulation. These features are provided by the Web Reports program, which can be run at any time from the desktop by selecting Start>Programs>Enterprise>Web Reports or from the Console by selecting Tools>View Web Reports.

When one runs the Web Reports program, it presents one with an overview of relevant Fixlet messages and remediation efforts. One finds charts summarizing the number of administered computers in the network and vulnerability status. In addition, one finds overall statistics and a list of the most common issues detected. One can click on these popular Fixlet messages to see them in greater detail.

At the top of the screen are five tabs offering different services:

Overview: The default screen one see when one start up the Web Reports program.

Stored Reports: Select from a list of previously-defined reports. Some commonly-requested reports are built-in, such as Operating System Distribution and Vulnerability Trends. Select them from the top list. One can create own custom reports and save them as either Public or private (viewable only by one). public reports are added to the top list, private reports are only available when one log in with a correct password.

Create Report: This section allows one to create custom reports based on Fixlet messages, retrieved properties of computers and actions. One can look at all databases, or select specific ones. One can also create custom filters and save them for other reports.

Retrieved Properties, including single or multiple properties.

Computers, listed by status.

Fixlets, individually or listed by relevance, compliance or progress.

Actions, individually or by user.

Historical, by relevant or average count.

Settings: This section contains information about the currently logged-in user, including the type of operator and the database settings for aggregation.

Logout: Click this tab to log out of the Web Reports program.

There are three buttons at the bottom of most reports:

Export to Excel. Creates a comma-separated value (csv) list which can be read into Excel (or spreadsheet of choice). Once in the spreadsheet, the report can b e manipulated, charted or printed.

Printable Version. Reformats the listing for printing.

Store Report. Saves report to a public or private space. A public report can be used by any authorized Operator. A private report can only be viewed by the user who created it.

Creating Web Reports

Using the Web Reports program, one can create reports that can be printed out or exported to Microsoft Excel for further manipulation. Creating a report is as simple as clicking a few buttons to customize the output, but do not let the simplicity fool one—there are thousands of different reports that can be generated by this Web-based program.

To create a Web report, follow these steps:
1. Choose Tools>View Web Reports.
2. Select a Web Reports Server URL from the list and click Launch Web Reports.
3. Enter Username and Password and click Login.
4. From the tabs at the top of the screen, choose Create Report to specify the desired data for a custom report.
5. Select a Report Type (see below) from the list of buttons on the left and click Next.
6. Select secondary information and filters to customize report and click Next again to generate the report.
7. Click a button at the bottom of the screen to print, export or save the results.

There are several types of report, divided into five main categories. Click one of the buttons on the left edge of the screen to specify the type and subtype of the report one desire. For most of the selections, one may also be able to filter the data to shorten the reports. If a particular report type does not allow these filters, the filter controls are grayed out.

The available report types (grouped into five categories) are:

Retrieved Properties: These are the properties of the Client computers, including reports on single or multiple properties.

Single Retrieved Property status. When one click the Next button, one can specify the property of interest, such as CPU, User Name or Operating System. Select a graph type for the report and click Next again.

Retrieved Property list. When one click the Next button, one can specify up to three levels of retrieved properties to categorize the networked computers. For each computer in this listing one can specify extra information, including relevant Fixlet messages. Click Next again to output the report.

Computers: Create reports on the networked Client computers.

Single computer status. Click the Next button to bring up a list of computers. Select a single computer and click Next again for a report.

Fixlets: Create several different Fixlet message and action reports.

All Fixlets list. When one click the Next button, one receives a paged list of all the Fixlet messages in the indicated databases, whether they are relevant to any computers on the system or not.

Currently relevant Fixlets. When one click the Next button, one receives a paged list of all the relevant Fixlet messages in the indicated databases.

Issue assessment. When one click the Next button, one can select specific Fixlet sites and Fixlet messages from the list for a report on relevant Fixlet messages.

Issue compliance. When one click the Next button, one can select specific Fixlet sites and Fixlet messages from the list for a report on compliance with the Fixlet actions issued.

Fixlet progress. When one click the Next button, one can select specific Fixlet sites and Fixlet messages from the list for a progress report.

Actions: Create action reports, on a user-by-user basis.

Open actions by user. Click the Next button, to bring up a list of users. Select the users one wants for this report and click Next again.

Historical: Create historical timeline reports on relevant Fixlet messages.

Relevant Fixlet count. Click the Next button to choose a range of dates to limit this historical report. One sees a graphical display representing the number of Fixlet messages that have become relevant on the network over time, along with a list of the same data.

Average relevant Fixlets per computer count. Click the Next button to choose a range of dates to limit this historical report. One sees a graphical display representing the average number of relevant Fixlet messages per computer over time, along with a list of the same data.

There are three buttons at the bottom of most reports:

Export to Excel. Creates a comma-separated value (csv) list which can be read into Excel (or spreadsheet of choice). Once in the spreadsheet, the report can be manipulated, charted or printed.

Printable Version. Reformats the listing for printing.

Store Report. Saves report to a public or private space. A public report can be used by any authorized Operator. A private report can only be viewed by the user who created it.

Viewing Web Reports

One can view the data in the database from several different points of view and save or print the output for inventory or audit purposes. One may also export the reports to Excel for further manipulation.

Web Reports can be viewed at any time by selecting Start>Programs>Enterprise>Web Reports from the desktop.

Or one can start it from the Console:
1. Choose Tools>View Web Reports.
2. Select a Web Reports Server URL from the list and click Launch Web Reports.
3. Enter Usemame and Password and click Login.
4. From the tabs at the top of the screen, choose:

Overview to see important metrics of installation, including Fixlet messages, actions, computers and vulnerability.

Stored Reports to see previously saved reports.

Create Report to specify the desired data for a custom report.

Settings to view the current User and Database settings.

Logout to quit Web Reports.

5. At the bottom of most reports one generate, one finds buttons to print, export or save the results. Optimizing Performance.

Using SQL Server

The Server installer includes an installer for MSDE 2000 SP3a. Due to restrictions built into MSDE 2000 by Microsoft, when too many database connections are open, MSDE slows itself down. The Server components use several database connections and each Console operator also uses a database connection. When multiple Consoles are running at the same time, one may see some performance degradation due to the MSDE restrictions. This can corrected by using SQL Server 2000 instead of MSDE 2000.

Editing the Computer Settings has a number of advanced configuration settings that allow one to fine-tune deployment for optimal performance. One can customize the behavior of any Server, Relay or Client in the network. It is recommended that one gain some experience with the default settings before one edits these values. These settings are at the heart of the system, granting one great power, but requiring careful planning.

To edit the settings for a particular computer or set of computers, follow these steps:

1. Open the Console and select a computer or a set of computers from any list.
2. Select Edit>Edit Computer Settings. Or, in any computer listing, right-click on a highlighted set of computers and select Edit Computer Settings from the pop-up menu.
3. If one selected a single computer, click the Add button. A dialog box pops up, with fields for the name and value of the setting.
4. If one selected more than one computer, one will see a dialog box with four tabs. Under the Settings tab, check the Custom Setting box. The Name and Value text boxes become editable.
5. Create a custom setting using one of the names in the two lists below, depending on whether the selected computer is a Client, Relay or Server.
6. Click OK to propagate the computer setting (it is deployed as an action), which takes effect immediately on all targeted clients. To confirm a setting, select a computer from the list by double-clicking on it, then choose the Computer Settings tab in the bottom panel.

File Menu

The File Menu offers the following commands:

Change Database Password . . . Change the sign-in password for the connected database.

Open Open the selected item in a list. This typically brings up a document in the bottom area of the Console.

Close Close the document in the bottom area of the Console.

Preferences . . . Set security, refresh and Client heartbeat.

Exit Quit the program.

Edit Menu

The Edit Menu offers the following commands:

Cut Cut text and put in clipboard. This command is for use in the various text boxes that the Console uses for data input.

Copy Copy text and put in clipboard.

Paste Insert the contents of the clipboard. This option is only activated when there is an editable text box on the screen.

Select All Select all items in the current window. This can be text or items in a list box.

Take Default Action Execute the default action for this particular Fixlet message.

Hide Fixlet Message Removes the selected Fixlet message(s) from the list. This simply hides the Fixlet message on a given Console. The Fixlet itself is not actually deleted, and is still visible on other Consoles.

Edit Computer Settings . . . Edit the settings (locking, Relays and custom settings) for the selected computer(s). Typically, one edits settings on a computer by computer basis, but one can also set multiple computer settings at the same time.

Send Refresh Refresh the displayed list of computers by querying the database.

Remove Computer Remove the selected computer(s) from the list. These computers are no longer under administration.

Show Action Info . . . View information about a selected action's execution.

Stop Action Stop the selected action(s).

Restart Action Restart the selected action(s).

Assign User Management Rights . . . Brings up a display that lets one grant and revoke management rights on a computer-by-computer basis.

View Menu

The View Menu offers the following commands:

Fixlet Messages View the descriptive body of the Fixlet message. This has the same effect as clicking the Fixlet Messages tab on the main window.

Computers Display a list of all Clients. For each one it shows relevant Fixlet messages, actions, a history of previously executed actions and selected properties of the Client. This has the same effect as clicking on the Computers tab on the main window.

Actions Display a list of the current action status for all selected Clients, detailing the affected computers, targets, messages, constraints and execution. This has the same effect as clicking on the Actions tab on the main window.

Console Operators Display a list of the authorized Console operators, whether they are logged on or not. This has the same effect as clicking on the Console Operators tab on the main window.

Show Fixlet Message Properties View the Fixlet properties, including the relevance expressions and the action scripts. The properties panel shows up to the right of the Fixlet description. Select this menu item to toggle its state.

Show Status Bar Display the number of relevant messages and the connected database in the status bar at the bottom of the Console window. Select this menu item to toggle its state.

Show Only Relevant Messages Show only relevant messages and mask non-relevant messages (the default). This is the standard and recommended way to operate the Console. If one unchecks this option, hundreds of Fixlet messages that are not relevant to the network are displayed. All nonrelevant messages in the list are grayed out. This menu item acts as a toggle.

Show If All Computers Are Locked Computers on the network can be locked so that Fixlet actions.

are not accepted by them. This toggling menu item shows or hides those messages that are relevant entirely on locked computers.

Hidden Fixlets List Fixlet messages that have been hidden.

Refresh Redraw the display based on the latest information from the database.

Tools Menu

The Tools Menu offers the following commands:

Manage Sites . . . Initiate, cancel or modify subscriptions to Fixlet sites. Also lets one assign various Fixlet sites to specific Clients.

Define Retrieved Properties . . . Create a list of properties to retrieve from the Clients, using Relevance clauses. These properties become the column headers on client listings. There is a default set of properties, but one may add or delete them. Properties are used to filter or select subsets of Clients for Fixlet action deployment.

Take Custom Action . . . Execute a custom command, targeted to any desired subset of Client computers.

Manage Signing Keys . . . Present a dialog box to input and manage the various signing keys for the Action Site.

View Web Reports . . . This dialog provides access to Web reports which are collected from various Servers and aggregated into a set of HTML reports summarizing the history and status of Fixlet messages and actions across extended the networks of computers.

Window Menu

The Window Menu offers the following commands:

Close All Close all the windows in the workspace.

Cascade Overlap all the open windows in the workspace.

Tile Tile all the open windows in the workspace.

Arrange Icons Convert open windows to icons that one can arrange in the window.

Numbered Windows This is a list of the windows that are currently open. Click on one to bring it to the top.

Help Menu

The Help Menu offers the following commands:

Contents Provide integrated help.

About Enterprise

Console . . . Display the version number of the program.

Dialogs

About Console

The About dialog displays the version of the Enterprise System Console. It also includes an e-mail address for tech support and a list of the developers. This dialog is available by selecting:

Help>About Enterprise Console . . .

Action: Reported Computers

One can view the status of an action as it is deployed across the network. Just click the Actions tab and double-click on the desired action from the list. In the lower part of the screen, the Action opens up in its own document window, displaying details of the deployment.

The Reported Computers tab of the Action document displays a filter/list of the computers targeted by the action, along with the current status of each. This set of computers was targeted when the action was initially specified. The deployed actions progress through a series of well defined stages on a given computer. This dialog lets one track all the stages of each action across all targeted computers.

This dialog is available by clicking the Actions tab and double-clicking on an action from the list. Then click the Reported Computers tab in the Action document window.

Action: Constraints

The Constraints tab of the Action document is a read-only display. It shows the scheduled actions and specifies whether user action is needed. These settings were created when the action was initially specified. (To change these values, see Take Action—Constraints).

Schedule: Shows the expirations and blocks of time for execution.

Expire Action XX days from now: If this button has been checked, the action expires in the given number of days. After the expiration date, the action is no longer applied, even if the Fixlet message becomes relevant again.

Run between HH:MM and HH:MM: This box is checked to define a block of time when the current action can be executed.

Run between HH:MM and HH:MM: This box is checked to define a second block of time when the current action can be executed.

User: Shows whether or not a user should be present and logged in to assist with the Fixlet action.

Run independent of user presence: Execute the action whether a user is present or not. This might be appropriate for critical updates or small, silent installs.

Run only when no user is present: Execute the action only when the user is not logged in. This might be desired for long installs that might happen overnight, but only on unoccupied Clients.

Run only when a user is present: Execute action only when a user is logged in. This might be desired when the action requires user feedback or intervention.

Computer: Shows any subset of computers for the action.

Run only when [Property] [Operator] [Value]: This box is checked to filter the Clients by the values of their retrieved properties. This dialog is available by clicking the Actions tab and double-clicking on an action from the list. Then click the Constraints tab in the Action document window.

Action Document

Figure 7:
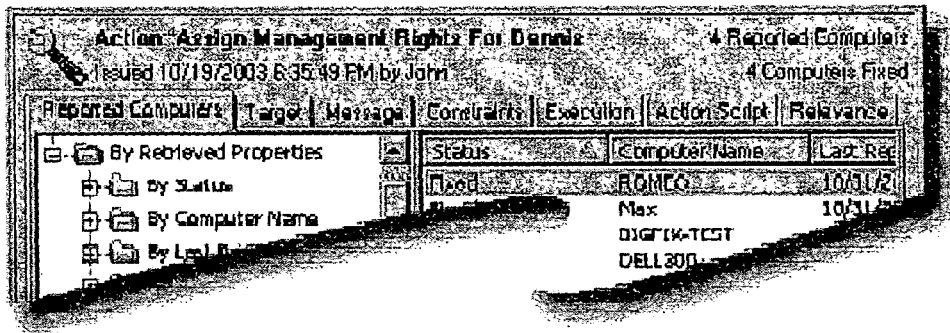
FIG. 7 is a screen shot showing an Action document during a sample session according to the invention.

An Action document (see FIG. 7) is displayed in the bottom window of the Console when one opens an action from any action list. One can do this by double-clicking an item or right-clicking and selecting Open from the pop-up menu. In the bottom panel one sees a document as shown in FIG. 7.

At the top of the Action document one finds the name, a time stamp, the operator's name, how many computers were affected and how many were fixed. There are seven tabs in an Action document. They are:

Reported Computers: A list of the Clients that have responded to this action. This is a typical filter/list panel for computers; click on a filter in the left panel to narrow down the list of computers in the right panel.

Target: Shows what subset of computers was originally targeted by the action.

Message: Shows what user message, if any, was supplied with the action.

Constraints: Details scheduling or user constraints on this action.

Execution: Shows details on how to execute the actions, including retries and post-action options.

Action Script: Displays the actual action script, in human-readable form.

Relevance: Shows the relevance statement that targets this action, in human-readable form.

An Action document is opened whenever one open an item in an action list. To display an action list, click the Actions tab.

Action: Execution

The Execution tab of the Action document is a read-only display. It shows the execution settings that were created when this action was initially specified. (To set or change these values, see Take Action—Execution).

Automated Application: Displays the automated application status for the selected action.

If the Fixlet Message becomes relevant again after the action has successfully executed, automatically reapply the action. If this box was checked when the action was deployed, the action are reapplied should it ever become relevant again.

Limit to XX reapplications. If the above box is checked, it indicates that the action is reapplied no more than the given number of times after a successful execution.

Retries: Displays the number of retries if an action fails to execute.

On failure, retry XX times: This box is checked to retry the action in case of a failure. If an action fails, it may be that the user dismissed it or that the computer crashed or was otherwise unable to execute the action. The other conditions are:

Wait XX between attempts: Displays the period of time to wait before retrying the action (the default is one hour).

Wait until computer has rebooted: Shows whether the Client should reboot before trying to execute the action again.

Post-Action: Shows what (if any) mop-up duties must be done when an action completes.

Do nothing after action completes: This is the default. Typically, a Fixlet action does not require any further activity.

Restart computer after action completes: This box is checked if a downloaded program or patch requires the computer to be rebooted after running.

Force restart after XX seconds: specifies the number of seconds to wait before forcing a restart.

Shutdown computer after action completes: This box is checked if the computer are shut down after the action completes.

Force shutdown after XX seconds: specifies the number of seconds to wait before forcing a shutdown.

Temporal Distribution: Indicates if the execution of actions is being staggered to reduce the hit to the network.

Distribute execution of the action over XX minutes to reduce the network load: If this box is checked, the program spaces out the execution of actions over a period of time. This is especially useful for Relays with many attached clients. By spreading out the load, a Relay can easily serve hundreds of Clients.

This dialog is available by clicking the Actions tab and double-clicking on an action from the list. Then click the Execution tab in the Action document window.

Action Site Signing Keys

This dialog prompts the Console operator to supply private keys and certificates that are needed to authorize actions before they can be deployed.

The Console operator must obtain these items from the Site Administrator, who must first create them using the Authorize Tool.

The three documents one must get from the Site Administrator are:

Private Key: A file (publisher.pvk) containing the publisher's private signing key.

Publishing Certificate: A file (publisher.crt) containing a certified copy of the publisher's public key.

License Certificate: A file (license.crt) containing the action site's certificate, signed by a signature authority.

Once these three documents have been created, the Site Administrator can then hand them out to authorized personnel. Without these certificates, actions can't be propagated. To sign an action, the authorized Console operator must browse to the appropriate certificates (usually stored on a removable disk) and provide a password.

This dialog also allows Console operators to change their passwords. Click the Change Password button at the bottom of the screen.

Action: Message

The Message tab of the Action document is a read-only display. It shows the settings of the message box that were created when the action was initially specified. (To set these values see.

Take Action—Message).

Display message before running action: This box indicates whether a message are presented. When this box is checked, the box below displays the message.

Message Title: The title line for the message that are shown to the user.

Message Text: An optional message to be shown to the user.

Message Buttons: Two optional buttons to display to the user:

View Action Script: If this box is checked, the Client message contains a button allowing the user to see what the action does.

Cancel: If this box is checked, the Client message contains a button allowing the user to cancel out of the action. If one check the button above, it makes sense to also add a cancel button.

This dialog is available by clicking the Actions tab and double-clicking on an action from the list. Then click the Message tab in the Action document window.

Action Progress Report

This dialog box shows the progress of an action as it is applied across the Fixlet the network. First, it shows the progress of any downloads (patches, updates, etc.). If there are files to download, it displays the name of the downloaded file, the total number of bytes, the current amount downloaded, the transfer rate and the estimated time to completion.

There are three buttons at the bottom of the progress dialog:

Hide: Hides this dialog box. The actions continue but are not displayed.

Stop Action: Stops the execution of the current action on those Clients that are still waiting or running.

More Info: Shows more information about the progress of the current action. It closes this window and opens an Action document with the current action(s) listed.

Action: Relevance

The Relevance tab of the Action document is a read-only display. It shows what criteria are being used to judge when a computer is considered to be fixed. Typically, the original Fixlet is designed to trigger only when it becomes relevant to the given computer. Fixing the problem also deactivates the trigger, so the Fixlet is no longer relevant (it becomes FALSE). In other words, a computer is considered to be fixed when the Fixlet no longer applies. That is the automatic solution and is the default setting (top button).

There may be reasons to specify different criteria, provides three options:

Consider a computer to be "Fixed" when:

The action script was run, and the original Fixlet Message relevance expression is FALSE. This is the default action, and the one most recommended.

All lines of the action script have been completed. In certain circumstances, it may be more reasonable to consider that a computer is not fixed until the action has finished executing its last line.

The action script was run, and the following relevance expression is FALSE. If a change was made to the default relevance expression, the customized version are listed in the following text box.

This dialog is available by clicking the Actions tab and double-clicking on an action from the list. Then click the Relevance tab in the Action document window.

Action: Action Script

The Action Script tab of the Action document is a read-only display. It shows the action script that was initially selected for deployment. (To set or change these values, see Take Action—Action Script).

Use the action script specified in the Fixlet message: This is the default for most Fixlet actions, and is the recommended option.

Use the following action script: If one opted to create a custom action script when one deployed this action, this button are selected, and the following two items determines the course of the action.

Action Script Type: The type of action script are indicated here.

Action Script: The actual code of the action script is in this text box. Typically, it is the prepackaged action that came with the Fixlet message, but it may also represent a custom action.

This dialog is available by clicking the Actions tab and double-clicking on an action from the list. Then click the Action Script tab in the Action document window.

Action: Target

The Target tab of the Action document presents a read-only display. It shows which computers were originally targeted when the action was initiated. (To set these values, see Take Action—Target).

There are two radio buttons at the top of this dialog:

Specific Computers selected in the list below. The currently displayed computer list (typically just the relevant computers) guides the application of actions. This is the default behavior.

All computers with the Retrieved Properties values selected in the tree below. This button causes continued evaluation of the specified retrieved property across the network. In essence, an action targeted like this is waiting for any client computer to change some retrieved property, like its OS or its disk space. Because of the open-ended nature of an action like this, it should always contain an expiration date (look under the Constraints tab).

This dialog is available by clicking the Actions tab and double-clicking on an action from the list. Then click the Target tab in the Action document window.

Actions Tab

Figure 8:
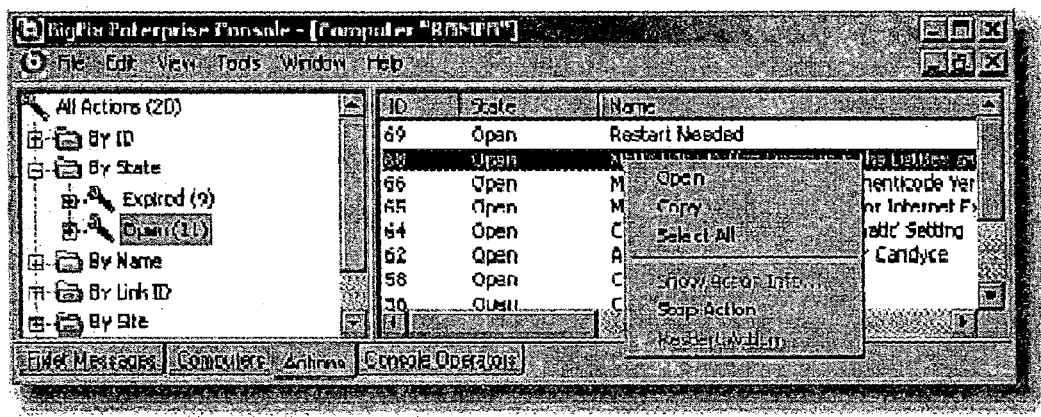
FIG. 8 is a screen shot showing a filter panel and list of Fixlet actions a sample session according to the invention.

The Actions tab allows one to follow the progress of all the Fixlet actions that have been deployed across the network to date. Click the Actions tab to bring up a filter panel and a list of Fixlet actions. FIG. 8 is a screenshot that shows the filter panel on the left, the list on the right, and the right-click menu. The list includes every action generated on this the network, deployed from the Take Action dialog. The filter panel on the left helps one winnow down the list of actions on the right. The folders in the filter panel also correspond to the column headers in the action list, so one can filter the list and then sort the remaining items. These are the filtering and sorting field names:

ID: A numeric identifier assigned by to label each action.

State: The current status of the action as it attempts to execute.

Name: The name associated with the action, typically the same as the Fixlet name.

Link ID: The ID of the action button, usually Action1. This identifies which of the multiple possible actions in a Fixlet message have been deployed. Actions used to apply settings have a blank Link ID.

Site: The name of the Fixlet Site associated with the action. Actions used to apply settings have a blank Site name.

Issued By: The database user name of the person who authorized this action.

Time Issued: A time stamp for when the action was issued.

The right-click menu presents one with some common commands:

Open: Open this action in the Action document window.

Copy: Copy this action to the clipboard, so one can paste it into a text window, such as notepad or wordpad.

Select All: Select all the actions in this list.

Show Action Info: Bring up the Show Action dialog.

Stop Action: If the action is still open, one can stop it by selecting this option.

Restart Action: If the action has been stopped, one can restart it with this option.

To learn more about an action, double-click on it from the list or right-click and choose Open from the pop-up menu. That brings up an Action document in the work area below. This dialog is available by clicking the Actions tab, selecting View>Actions or pressing the F11 key.

Add Custom Setting

This dialog box lets one edit or add a custom setting to the selected computer. Type a name for the variable in the first input box, and type the value of the variable in the second box. This dialog is available from the Edit Computer Settings dialog. Right-click on a computer from any listing and then select Edit Computer Settings from the pop-up menu.

Assign User Management Rights

The Assign User Management Rights dialog lets one add or delete computers from an operator's purview. This dialog displays the current set of computers that can be managed by the selected Console operator and lets one add or delete computers from that set. There are two buttons in this dialog:

Add: Add new computers to the current set of computers. This brings up a standard filter/list box of the computers on the network. Use the values of the retrieved properties to filter down the group of computers for this operator. The use of retrieved properties—including custom properties—makes it simple to group computers. For instance, one may want to group computers by their operating system or CPU type. Or one might create a special computer setting, like department or location, and use that to parcel out management rights to the selected operator. Or there may be computers using particular applications that one want to assign to specialists in organization.

Delete: This button lets one delete computers from the domain of this operator. It brings up a dialog that lets one choose which retrieved property filters one want to delete. (If a single filter was defining the rights, when one select Delete, it does so without bringing up this dialog).

This dialog is available by selecting the Console Operators tab, right-clicking on any operator in the list and choosing Assign User Management Rights from the pop-up menu (or choose Assign User Management Rights from the Edit menu).

Console Help

Show the help files for the Console. These on-line files provide a tutorial, a description of the program and a full-text search capacity.

This dialog is available by selecting:

Help>Contents

Computer: Action History

The Action History tab provides a listing of all the actions that have been deployed on the specified computer. Note that unlike the general action list for all computers available from the main Actions Tab, this list contains only actions targeted to the selected computer. The Action History list has the following headers:

ID: A numeric identifier assigned by to label each action.

State: The current status of the action as it attempts to execute.

Name: The name associated with the action, typically the same as the Fixlet name.

Link ID: The ID of the action button, usually Action1. This identifies which of the multiple possible actions in a Fixlet message have been deployed. Actions used to apply settings have a blank Link ID.

Site: The name of the Fixlet Site associated with the action. Actions used to apply settings have a blank Site name.

Issued By: The database user name of the person who authorized this action.

Time Issued: A time stamp for when the action was issued.

To view more information about a particular action, double-click on it. That will bring up an Action document in the bottom panel. This dialog is available by clicking the Computers tab and double-clicking on a computer from the list. Then click the Action History tab in the Computer document window.

Computer Document

A Computer document is displayed in the bottom window of the Console when one open an item from any computer list. One can do this by double-clicking on the item or right-clicking and selecting Open from the pop-up menu. One sees a window as shown on FIG. 9. At the top of the Computer document one finds the name, information about the processor and operating system, how many Fixlet messages are relevant to this computer, and how many actions are open.

There are six tabs in a Computer document. They are:

Relevant Fixlet Messages: A list of the Fixlet messages that are currently relevant on this computer.

Action History: Shows what Fixlet actions have been applied to this computer.

Fixlet Message History: A list of all the Fixlet messages that have ever been relevant on this computer.

Retrieved Properties: Displays a list of properties that are being retrieved from this computer.

Computer Settings: Shows the locked and relay status of this computer.

Management Rights: Displays the names of the authorized operators for this computer.

A Fixlet document is opened whenever one open (double-click) an item in any Fixlet list. To display a Fixlet list, click the Fixlet Messages tab.

Computer: Fixlet Message History

The Fixlet Message History tab of the Computer Status dialog displays a list of all the Fixlet messages that have become relevant over time on any given computer. The list can be sorted by the column headers in both ascending or descending order. One can add or delete column headers by right-clicking on them and selecting new headers from the pop-up list. The column headers include:

Name: The name assigned to the Fixlet message by the author.

Source Severity: A measure of how serious a Fixlet message is, assigned by the Fixlet author. Typical values are Critical, Important, Moderate or Low.

ID: A numerical ID assigned to the Fixlet message by the author.

Site: The name of the site that is generating the relevant Fixlet message.

Affected Computer Count: The number of Clients in the network currently affected by the Fixlet message.

Unlocked Computer Count: The number of unlocked computers affected by this Fixlet message.

Open Action Count: Number of distinct actions open for the given Fixlet message.

Category: The type of Fixlet message, such as a security patch or update.

Download Size: The size of the remedial file or patch that the action downloads.

Source: The name of the source company that provided the Fixlet information.

Source ID: An ID number for the source.

Source Release Date: The date this Fixlet message was released.

This dialog is available by clicking the Computers tab and double-clicking on the desired computer in the right-hand list. Then click the Fixlet Message History tab in the Computer document window.

Computer: Management Rights

The Management Rights tab of the Computer Status dialog lists the users who are currently granted management rights to apply actions to specified computers. To edit the current set of managers, click on the Edit Management Rights button above this list. The list has three headers:

Name: The name of the Console operator who has been granted rights.

Master Operator: A Yes or No flag that indicates if the rights manager is also a Master Operator.

Last Login Time: The last time this operator logged in to the System.

This dialog is available by clicking the Computers tab and double-clicking on a computer from the list. Then click the Management Rights tab in the Computer document window.

Computer: Retrieved Properties

The Properties tab of the Computer document lists various properties of the given computer. These properties are derived from Relevance Expressions, and one can customize them by right-clicking in the column header of any computer list in the Console. These properties help one define subsets or sorting fields for the various client computers under administration.

The default properties include, but are not limited to:

Computer Name: The name of the computer.

User Name: The name of the Client user.

OS: The operating system of the given computer.

CPU: The speed and type of CPU.

Locked: The locked status (Yes or No) of each computer.

Last Report Time: The time that the computer last reported.

RAM: The amount of RAM in the given computer.

Version of IE: The version of Internet explorer on the given computer.

Free Space on System Drive: How much room is available on drive C of the given computer.

Total Size of System Drive: The total size of drive C on the given computer.

BIOS: The version and date of the Basic Input/Output System.

Active Directory Path: The position of the Client within the Active Directory hierarchy.

ID: The ID number of the Client computer, set automatically.

If one accidentally remove or redefine these predefined properties, one can restore them by reentering their definitions. Find out more in the sections on computer properties and Relevance Expressions.

This dialog is available by clicking the Computers tab and double-clicking on a computer from the right-hand list. Then click the Retrieved Properties tab in the Computer document window.

Computer: Relevant Fixlet Messages

The Relevant Fixlet Messages tab of the Computer document lists all the Fixlet messages that are relevant to the selected computer. This filter list is updated in real-time, refreshing its display as Fixlet messages are reevaluated.

Filter panel: This panel lets one filter the list of Fixlet messages. Select a folder (like Source Severity) then pick a value (like Critical) to filter the right-hand list down to a more manageable size.

List of Fixlet messages: This list shows the current Fixlet messages sorted by the chosen header field. Right-click on a header to choose new headers from a pop-up menu. Here are some of the headers one may see:

Name: The name assigned to the Fixlet message by the author.

Source Severity: A measure of how serious a Fixlet message is, assigned by the

Fixlet author. Typical values are Critical, Important, Moderate or Low.

ID: A numerical ID assigned to the Fixlet message by the author.

Site: The name of the site that is generating the relevant Fixlet message.

Affected Computer Count: The number of Clients in the network currently affected by the Fixlet message.

Unlocked Computer Count: The number of unlocked computers affected by this Fixlet message.

Open Action Count: Number of distinct actions open for the given Fixlet message.

Category: The type of Fixlet message, such as a security patch or update.

Download Size: The size of the remedial file or patch that the action downloads.

Source: The name of the source company that provided the Fixlet information.

Source ID: An ID number for the source.

Source Release Date: The date this Fixlet message was released.

This dialog is available by clicking the Computers tab and double-clicking on a computer from the list. Then click the Relevant Fixlet Messages tab in the Computer document window.

Computer: Computer Settings

The Computer Settings tab of a Computer document lists all the settings for the selected computer. This is a read-only display that includes locking, relays and custom settings:

Locked Status: Locked/Unlocked. Displays the current locking status, which determines whether or not Fixlet actions can be applied to this computer.

Relay Server Status: Indicates whether or not this computer is a Relay.

Primary Relay Server: Lists the name of the primary Relay pointed to by this computer.

Secondary Relay Server: Lists the name of the secondary Relay pointed to by this computer.

Custom Settings: This list shows the current settings for the selected computer:

Name: The name of the setting.

Value: The value of the setting.

Site: The name of the site that owns the setting. Settings applied by the Site Administrator or master operators are attributed to the Local site. It is also possible for Fixlet authors to create actions that define custom settings for their own sites; one would see them here.

This dialog is available by clicking the Computers tab and double-clicking on an computer from the list. Then click the Computer Settings tab in the Computer document window.

Computers Tab

Figure 10:
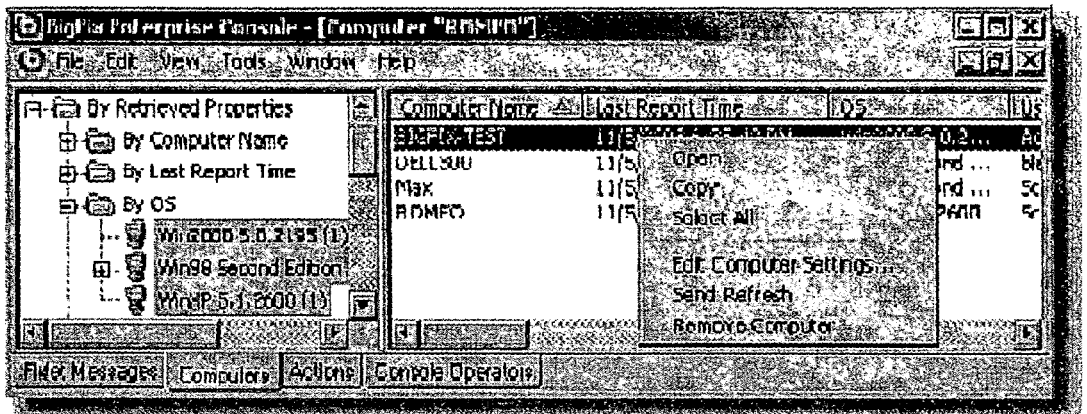
FIG. 10 is a screen shot showing a Computer tab filter/list during a sample session according to the invention.

The Computer tab displays all the Client computers on the network, along with their properties, that one can select for deeper inquiry. When one click on the Computers tab, one sees a filter/list. FIG. 10 is a screenshot that shows the filter panel on the left, the list on the right, and the right-click menu. Select an item from the left panel to filter the computer list. One can sort the list by clicking on the desired column header. Click again to change from ascending to descending order. The default column headings include (but are not limited to):

Computer Name: The name of the computer.

User Name: The name of the Client user.

OS: The operating system of the given computer.

CPU: The speed and type of CPU.

Locked: The locked status (Yes or No) of each computer.

Last Report Time: The time that the computer last reported.

RAM: The amount of RAM in the given computer.

Version of IE: The version of Internet explorer on the given computer.

Free Space on System Drive: How much room is available on drive C of the given computer.

Total Size of System Drive: The total size of drive C on the given computer.

BIOS: The version and date of the Basic Input/Output System.

Active Directory Path: The position of the Client within the Active Directory hierarchy.

ID: The ID number of the Client computer, set automatically.

These are some of the original predefined properties, but they can be customized by defining Retrieved Properties from the Tools menu. Using the relevance language, it is possible to retrieve a list of values (not just a single value) in a retrieved property, but these can't always be displayed properly. If this happens, a dialog box pops up to warn one, and that header field are hidden.

The right-click menu has these options:

Open: Open this computer for more information in the computer document area below.

Copy: Copy this info to the clipboard for pasting into a text box, such as notepad or wordpad.

Select All: Select all the computers in this list.

Edit Computer Settings: Edit the settings for this computer.

Send Refresh: Send a refresh signal to this computer, forcing it to evaluate its status and return it to the Console.

Remove Computer: Remove this computer from Administration.

To learn more about a computer, double-lick on it from the list or right-click and choose Open from the pop-up menu. That brings up a Computer document in the work area below.

This dialog is available by clicking on the Computers tab, selecting View>Computers or pressing the F10 key.

Connect to Database

The Connect to Database dialog pops up when one select Connect from the File Menu. It lets one select which Database one wish to manage.

Database: Select the desired database from the pull-down menu.

Username: Enter the user name that allows one to access the database. The set of allowed users is maintained by the Site Administrator using the Administration Tool.

Password: Enter the password that corresponds to the user name above. In some cases, NT authenticates for the user. If this is the case, the password box are grayed out.

This dialog is available by selecting:•File>Connect . . .

Edit Computer Settings

The Edit Settings dialog allows the Console operator to alter the settings for a selected computer. (To apply settings to multiple computers, ctrl-click or shift-click to select more than one computer).

Locked. Click this button to lock the computer.

Lock Expires MM/DD/YYY HH:MM. Set the date and time for the expiration of the lock.

Run relay server on this computer. Check this box to make the selected computer a Relay. This allows a single Windows 2000 computer to take over some of the download burden from a Server. A Relay gathers a download once from the Server and then redistributes it to a designated group of Clients. This can dramatically reduce client/server bandwidth.

Assign Relays Manually. Relays can be automatically assigned. Uncheck this box to select automatic discovery (the recommended setting). If one wants to manually specify a particular relay for this Client, check this box and select the desired relays from the pull-down menus below.

Primary Relay Server: Select the name of the primary Relay from the pull-down menu. The selected computer now points to this relay for Fixlet downloads instead of connecting directly to the Server.

Secondary Relay Server: Select the name of the secondary Relay from the pull down menu. If the primary relay is unavailable, then this secondary relay takes over the job of providing Fixlet downloads.

Custom Settings: This list box contains custom named variables that can be assigned to each computer. This is a valuable technique for organizing the network of computers, and can help to identify individual computers as well as groups. This data in the value column is editable simply by clicking in the fields and entering data.

Name: This column contains the assigned custom variable names, e.g., "depts."

Value: This column lists the values of the named variables, e.g., "human resources."

Site: As applied by the Console Operator, these named variables are a part of the "local" site. These variables may also be set by other Fixlet sites, in which case their site name shows up here.

There are three buttons to the right of the list:

Add: Click this button to add a new custom variable to the list.

Delete: Click this button to delete the selected variable from the list.

Edit: Click this button to edit the selected named variable. This places the cursor in the value field of the chosen setting for editing.

Finally, there is a More Options button at the bottom of the dialog, that expands on these functions.

This dialog is available by selecting the Computers tab, right-clicking on a computer and selecting Edit Computer Settings from the pop-up menu.

Edit Multiple Computer Settings

The Edit Multiple Computer Settings dialog allows Console operators to change certain computer attributes across a specified set of computers, including locking, making the client a Relay, pointing to Relays and creating custom settings.

There are four tabbed dialogs on this screen to target and customize the settings for a selected group of Clients:

Settings: Displays a group of controls to edit computer settings, such as the locked status, relays, and custom variables.

Target: Displays a filter/list of computers that can be edited, filtered, sorted and grouped for specifically targeted settings.

Message: Allows one to issue a message to the Client before activating the settings.

Constraints: As with other actions, one can limit the activation of the settings to any desired schedule. One can also specify certain user interactions and add extra targeting based on the contents of retrieved properties.

When multiple computers are selected, this dialog is available by right-clicking and selecting.

Edit Computer Settings from the pop-up menu (or select Edit Computer Settings from the Edit menu).

Edit Multiple Computer Settings—Constraints

The Constraints tab of the Edit Multiple Computer Settings dialog lets one schedule when settings are applied to the targeted Clients. Settings are issued as simple actions, which can be constrained in several ways:

Schedule: Set up expirations and blocks of time for activating the setting.

Expire Action XX days from now: If this button is checked, the attempt to activate a setting expires in the given number of days. After the expiration date, the action is no longer applied.

Run between HH:MM and HH:MM: Check this box to define a block of time when the setting can be activated.

Run between HH:MM and HH:MM: Check this box to define a second block of time when the setting can be activated.

User: Define whether a user should be present or not.

Run only when a user is present: Activate settings only when a user is present. This might be desired when the setting requires user feedback or intervention.

Run only when no user is present: Activate settings only in the absence of a user.

Run independent of user presence: Activate settings whether a user is present or not.

Computer: Select a subset of computers to receive the settings.

Run only when [Property] [Operator] [Value]: Check this box when one wants to filter the Clients by their retrieved properties. Select a Property and an Operator from the pull-down menus, then select a value for comparison. The value entered must form a valid relevance expression.

When multiple computers are selected, this dialog is available by right-clicking and selecting Edit Computer Settings from the pop-up menu. Then select the Constraints tab.

Edit Multiple Computer Settings—Message

The Message tab of the Edit Multiple Computer Settings dialog. Settings are propagated to the Clients as simple actions. As with other actions, one may want to notify the user before the setting is activated on a Client. The Message tab allows one to require that an active user be present when the setting is activated, to alert the user with a specific message, and to offer certain interactive features on the message display, including the ability to see more information about the proposed setting and to cancel the proposed setting.

Display message before running action: Check this box if one want to deliver a message.

When this box is checked, two boxes are opened for text entry:

Message Title: Type a title line for message.

Message Text: Type message in this text box.

Message Buttons: One can supply one or two optional buttons:

View Action Script: If this box is checked, the client message contains a button allowing the user to see what the action, in this case a simple setting, does.

Cancel: If this box is checked, the client message will contain a button allowing the user to cancel out of the action. If one checks the button above, it makes sense to also add a cancel button.

When multiple computers are selected, this dialog is available by right-clicking and selecting Edit Computer Settings from the pop-up menu. Then select the Message tab.

Edit Multiple Computer Settings—Settings

The Edit Multiple Computer Settings—Settings dialog allows the administrator to apply certain settings to multiple targeted computers, including locking, relays and custom variables. It includes the following controls:

Locking Status. Check this box to either lock or unlock the targeted computers. One might wish to lock a computer because it is currently being used in program development, it is in the middle of a lengthy process or because it is running specialized software. As long as a computer is locked, no actions are executed on it.

Locked. Click this button to lock the computer.

Lock Expires MM/DD/YYY HH:MM. Set the day and time for the expiration of the lock.

Unlocked. Unlock the targeted computers.

Relay Service Status. Check this box to enable or disable the service that connects this computer to a Relay.

Relay Service Enabled. Turn on the relay service so that Clients can collect Fixlet Messages from a local Relay, thus decreasing client/server bandwidth requirements.

Relay Service Disabled. Turn off the relay service.

Primary Relay Server. Select a primary Relay. Check the box and enter the IP address of the Windows 2000 computer that are used as the primary Relay. Any attached Clients then gather Fixlet downloads from this relay rather than directly from the Server.

Secondary Relay Server. Select a secondary Relay. Check the box and enter the IP address of the Windows 2000 computer that are used as the secondary Relay. Any attached Clients then gather Fixlet downloads from this relay if the primary relay is unavailable.

Custom Setting. This feature allows the Master Operator to create named variables that can be associated with the targeted computers.

Name. Type the name of a variable to be associated with all targeted computers, e.g., "department."

Value. Enter the value of the above-named variable, e.g., "payroll."

When multiple computers are selected, this dialog is available by right-clicking and selecting.

Edit Computer Settings from the pop-up menu.

Edit Multiple Computer Settings—Target

The Edit Multiple Computer Settings—Target tab lets one target a group of Client computers for the application of certain settings, including locking, relays and custom variables.

There are three basic ways to target Client computers:

Specific Computers selected in the list below. Click this button to apply the settings to the group of computers in the list box. This list defaults to the computers that were originally selected.

All Computers with the Retrieved Properties values selected in the tree below. Click this button, and then select a retrieved property to filter the list of computers.

All computers. Click this icon to apply the settings to all the computers in the network.

When multiple computers are selected, this dialog is available by right-clicking and selecting.

Edit Computer Settings from the pop-up menu. Then select the Target tab.

Enter Private Key

The Enter Private Key dialog requests a password. Type in the publisher password that one were given by Site Administrator. This dialog is displayed whenever an action is deployed, in order to assure that only authorized personnel are allowed to update computers on the network.

Fixlet: Action History

The Action History tab of the Fixlet document displays a list of all the actions deployed by this particular Fixlet. In order to see something in this dialog, one typically must have an Action still pending from this Fixlet.

This dialog is available by opening a Fixlet message from any list and clicking the Action History tab.

Fixlet Description

The Fixlet Description provides an English-language description of the problem and typically provides one or more actions that can be taken to remedy it. Click on the link or button to deploy the action across the network. When the action completes, the Fixlet usually disappears, since the problem no longer pertains.

The Fixlet Properties panel (slide the panel open from the right edge or select View>Show Fixlet Message Properties) exposes the Relevance Expressions and Action buttons, so the Console operator can scrutinize them before deployment. In the panel, one sees a group of numbered Relevance Expressions that are evaluated on each Client computer to decide if the Fixlet message is relevant to that computer. Below that one can see the list of actions that are executed on the relevant computers.

This dialog is available by opening a Fixlet message from any list and clicking the Description tab.

Fixlet Document

A Fixlet document is displayed in the bottom window of the Console when one open a message from any Fixlet list. One can do this by double-clicking on the Fixlet message or right-clicking and selecting Open from the pop-up menu (see FIG. 11). At the top of the Fixlet document one find the name, the severity of the Fixlet, how many computers were affected and how many actions are open.

There are three tabs in a Fixlet document. They are:
Description: A list of the Clients that have responded to this action. This is a typical filter/list panel for computers; click on a filter in the left panel to narrow down the list of computers in the right panel.
Relevant Computers: Shows what subset of computers was originally targeted by the action.
Action History: Shows what user message, if any, was supplied with the action.

A Fixlet document is opened whenever one open an item in a Fixlet list. To display a Fixlet list, click the Fixlet Messages tab.

Fixlet Properties Panel

The Fixlet Properties panel exposes the Relevance Expressions and Action buttons, so the Console operator can scrutinize them before deployment. In the panel, one sees a group of numbered Relevance Expressions that are evaluated on each Client computer to decide if the Fixlet message is relevant to that computer. Below that one can see the list of actions that can be executed on the relevant computers. This panel is always available when a Fixlet message is being displayed, but it may be slid all the way to the right. To expand the panel, grab the vertical divider at the right of the screen and drag it to the left.

This dialog is available by selecting:•View>Show Fixlet Message Properties

Fixlet: Relevant Computers

The Relevant Computers tab of the Fixlet document displays all the networked computers that are affected by the currently selected Fixlet message. This is a filter/list view with a filter panel on the left, allowing one to narrow down the displayed list of computers. To do so, just open a retrieved property from the left panel and select a value to filter the list. Like other filter/lists in the Console, one may sort it by clicking on the column headers. If one would like to add own custom headers, select Tools>Define Retrieved Properties . . .

This list is much like selecting the Computers tab from the main Console, but it only lists those computers that have this specific issue. Drilling down like this helps to focus efforts on one Fixlet at a time. This dialog is available by opening a Fixlet message from any list and clicking the Relevant.

Computers tab.

Fixlet Messages Tab

The Fixlet Messages tab displays all the Fixlet messages that are relevant on the network, along with their properties, that one can select for deeper inquiry. When one click on the Fixlet Messages tab, one sees a filter/list as shown on FIG. 12. This screenshot shows the filter panel on the left, the list on the right, and the right-click menu. Select an item from the filter panel on the left to winnow the list down to a more manageable size. One can sort the list by clicking on the desired column header. Click again to change from ascending to descending order. The column headings are:

Name: The name assigned to the Fixlet message by the author.

Source Severity: A measure of how serious a Fixlet message is, assigned by the Fixlet author. Typical values are Critical, Important, Moderate or Low.

ID: A numerical ID assigned to the Fixlet message by the author.

Site: The name of the site that is generating the relevant Fixlet message.

Affected Computer Count: The number of Clients in the network currently affected by the Fixlet message.

Unlocked Computer Count: The number of unlocked computers affected by this Fixlet message.

Open Action Count: Number of distinct actions open for the given Fixlet message.

Category: The type of Fixlet message, such as a security patch or update.

Download Size: The size of the remedial file or patch that the action downloads.

Source: The name of the source company that provided the Fixlet information.

Source ID: An ID number for the source.

Source Release Date: The date this Fixlet message was released.

The right-click menu has these options:

Open: Open this Fixlet message for more information in the computer document area below.

Copy: Copy this info to the clipboard for pasting into a text box, such as notepad or wordpad.

Select All: Select all the Fixlet messages in this list.

Hide Fixlet Message: Hide this Fixlet message. It still remains in the database, but is not displayed on this particular Console. To see or recall any hidden Fixlet messages, select.

View>Hidden Fixlets.

Take Default Action: Fixlet messages often have a default action which can automate their deployment. One can also highlight multiple Fixlet messages and, if they all have default actions, automate the entire deployment.

To learn more about a Fixlet message, double-click on it from the list or right-click and choose Open from the pop-up menu. That brings up a Fixlet document in the work area below.

This dialog is available by clicking on the Fixlet Messages tab, selecting View>Fixlet Messages or pressing the F9 key.

Hidden Fixlets

The Hidden Fixlets dialog is a listing of all the Fixlet messages that have been "hidden" from the Console. Hiding allows Console operators to indicate that they are no longer interested in listing the specified Fixlet message, even though it is relevant. Hidden Fixlet messages are still evaluated, even though they aren't displayed. The management of hidden Fixlet messages is local, and each Console keeps its own record of which Fixlet messages are hidden or not.

One can hide Fixlet messages by right-clicking on them from the Fixlet list and choosing "Hide Fixlet Message" from the pop-up menu.

One can also unhide—or restore—Fixlet messages from this interface. Click on the Fixlet message in the list, then click the Restore Fixlet button.

The list header includes the following fields:

Name: The name of the hidden Fixlet message.

ID: The ID number associated with the hidden Fixlet message.

Sitename: The Fixlet site containing the hidden Fixlet message.

This dialog is available by selecting:•View>Hidden Fixlets . . .

Main Console Window

The Main Console window (see FIG. 3) for the Enterprise Suite has an upper panel with four main tabs and a document window below that to expand upon each of these four key elements of the system. The way to operate the Console is to click on one of the four tabs and then double-click on an item from the resulting list. That opens a document in the bottom window with more detailed information about the selected item.

Main Tabs

Fixlet Messages: Displays a list of Fixlet messages that are relevant on the various Client computers on the network.

Computers: Displays a list of the Client computers on the network, along with several useful properties retrieved from those computers.

Actions: Displays a list of the Actions that have been or are currently running across the network.

Console Operators: Displays a list of authorized Console operators.

Filter Panel: This set of folders contains specific field values that one can use to narrow down the list panel on the right. For instance, after clicking the Fixlet Messages tab, one might open the Source Severity folder and select Critical to filter the list down to critical Fixlet messages only.

List Panel: This is the listing, as filtered by the filter panel (above). One can sort the list by clicking on the column headers. One can also rearrange the headers by dragging them left or right. There may be a pop-up menu when one right-click on one of the headers. If so, it contains a list of all the possible fields for one to select or deselect at will.

Right-click Menu: This is the context menu that shows up when one right-click on any item in a list. Each different list has a unique context menu.

Document Area: Below the tabbed area is a document window. When one double-click on an item from any list, it opens a detailed document in this area.

Document tabs: Each type of document has a unique set of tabs to go along with it.

Fixlet Message: If a Fixlet message is opened from the list, the Fixlet document explains the issue in plain English.

Action Button: A Fixlet document typically contains at least one Action, represented by a link or button. Click it to deploy the action across the network.

FIG. 3 is a screen shot from a typical session. The Fixlet Messages tab is selected, and the user is viewing a message opened from the list panel:

Manage Sites

The Manage Sites dialog brings up a list of the current set of Fixlet site subscriptions.

Fixlet Site Subscription List:

Add Site . . . To add a site, click this button. It brings up a Windows Open dialog, and lets one subscribe to a Fixlet site by selecting its masthead. These mastheads are usually saved in a masthead folder.

Remove Site: Click this button to unsubscribe from the selected Fixlet site.

NOTE: One can't delete the Support site, because it is needed to upgrade and manage licensing issues in the system.

Properties . . . Click this button to view the properties of this site.

Client Subscription: This section lets one filter the computers that are subscribed to the given site. First, select a Fixlet site from the above list, then click the radio button that says Only subscribe clients whose.

Subscribe all clients: Apply this Fixlet site to all Clients.

Only subscribe clients whose: Select a subset of Clients by filtering on the retrieved properties. From the pull-down menu, select a computer property, then select a comparison operator and a value. For instance one may wish to only subscribe Clients with Windows 98 to certain sites. One can extend the values in the pull-down menu by changing the Retrieved Properties.

This dialog is available by selecting:•Tools>Manage Sites . . .

Operator: Administered Computers

The Administered Computers tab of the Console Operator document displays a filter/list of all the computers administered by the selected operator. Like any other computer list, one can filter and sort it by retrieved properties. That means one can use own custom-created properties to parcel out administrative rights. One might use a retrieved property, for instance, to match up specific applications to experts in organization. Or one could connect departmental IT managers to their own domains, automatically. This list is similar to other computer lists in the Console, but it is specific to the selected operator, letting one focus on one person at a time. This dialog is available by double-clicking on an operator from any Console Operator list and selecting the Administered Computers tab.

Console Operator Document

A Console Operator document is displayed in the bottom window of the Console when one open an item from any Console Operator list. One can do this by double-clicking on the item or right-clicking and selecting Open from the pop-up menu (see FIG. 13). At the top of the Console Operator document one finds the name of the operator, the operator's login time, how many computers are being administered by this operator and how many actions this operator has issued.

There are three tabs in a Console Operator document. They are:

Administered Computers: A typical filter/list window containing all the computers under this operator's administration.

Issued Actions: Shows what Fixlet actions have been applied by this Console Operator.

Management Rights Assignment: A properties filter that limits the access rights to this Console Operator.

A Console Operator document is opened whenever one open an item in a Console Operator list. To display a Console Operator list, click the Console Operators tab.

Operator: Issued Actions

The Issued Actions tab of the Console Operator document displays a filter/list of all the actions that have been deployed by the selected operator. Like any other action list, one can filter and sort it by various properties. This list is similar to other action lists in the Console, but it is specific to the selected operator, letting one focus on one person at a time.

This dialog is available by double-clicking on an operator from any Console Operator list and selecting the Issued Actions tab.

Operator: Management Rights Assignment

The Management Rights Assignment tab of the Console Operator document displays a retrieved property tree. If there were any management rights assigned on the basis of a retrieved property (for instance, based on a computer setting named "department") one sees them here. In this example, as people changed from one department to another, they are automatically handed over to a new Console operator. This is a read-only display. To alter these settings, right-click on an operator from any Console Operator list and select Assign User Management Rights from the pop-up menu.

This dialog is available by double-clicking on an operator from any Console Operator list and selecting the Management Rights Assignment tab.

Console Operators Tab

Figure 14:
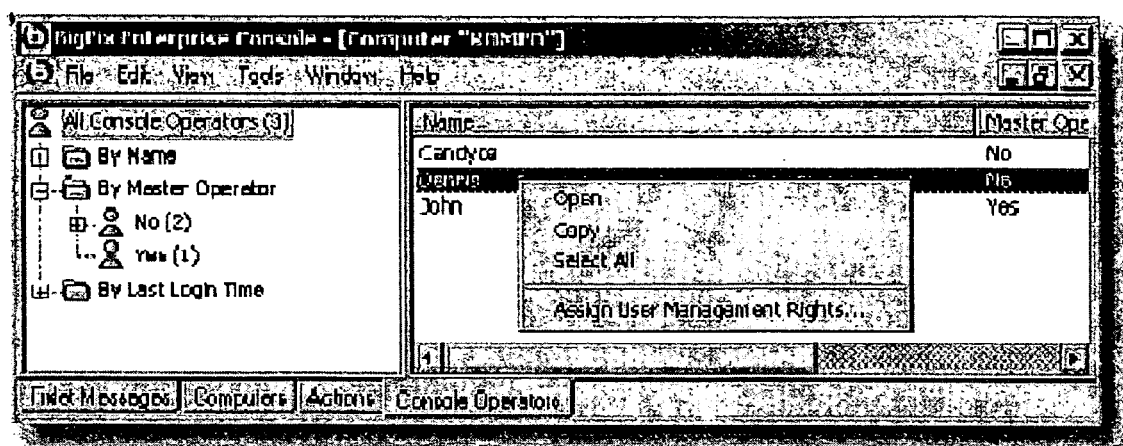
FIG. 14 is a screen shot showing a Console Operator's tab filter/list during a sample session according to the invention.
Figure 3:
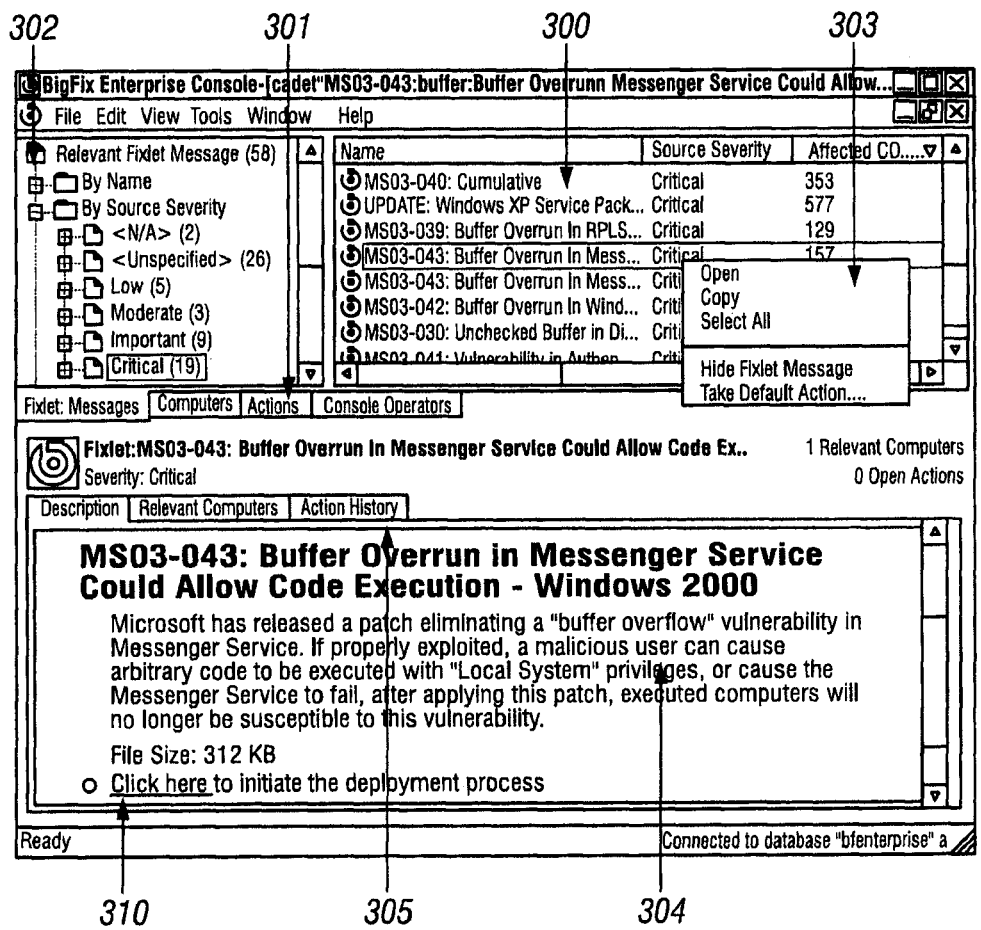
Figure 4:
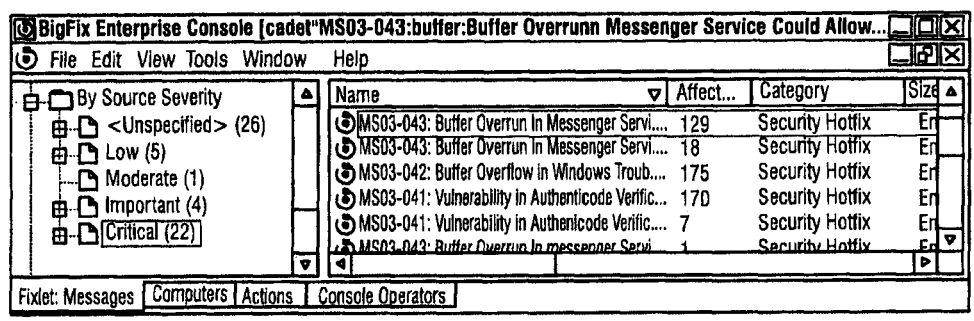
Figure 5:
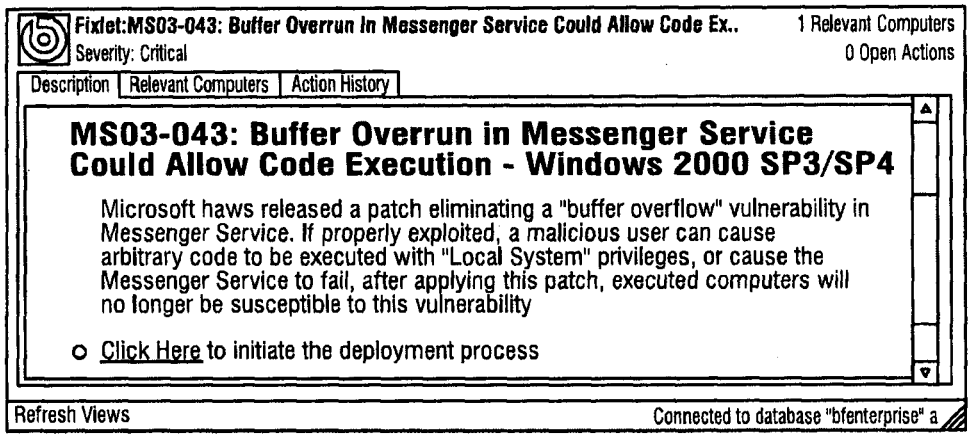
Figure 6:
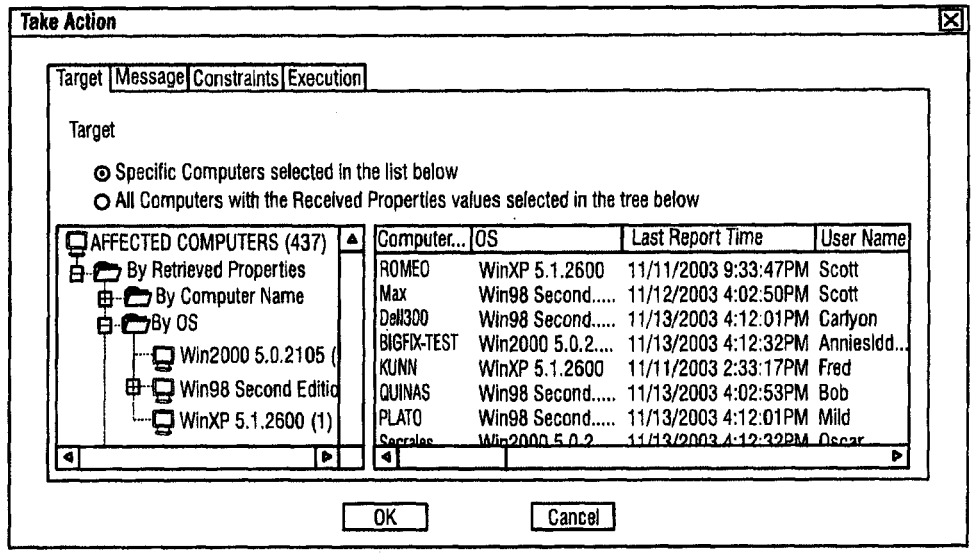
Figure 7:
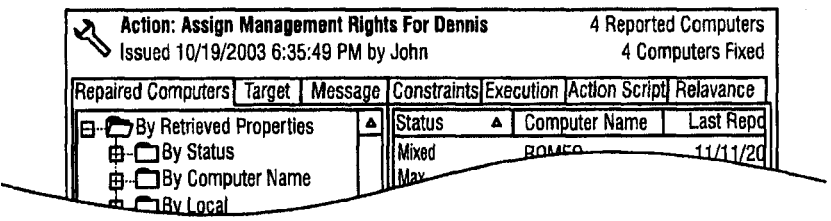
Figure 8:
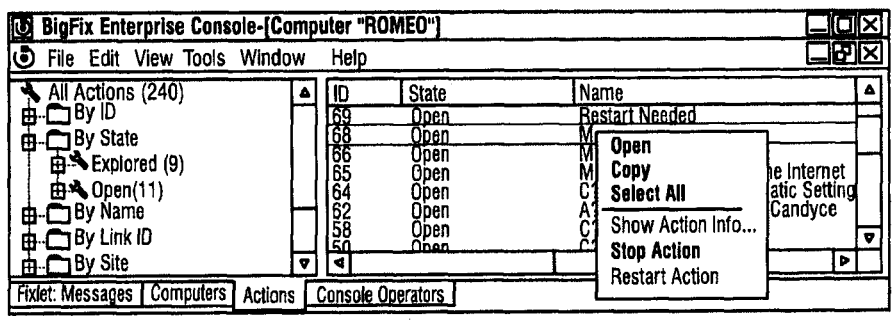
Figure 9:
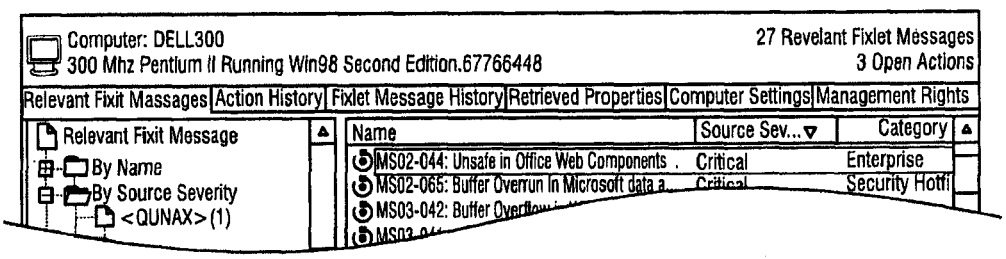
Figure 10:
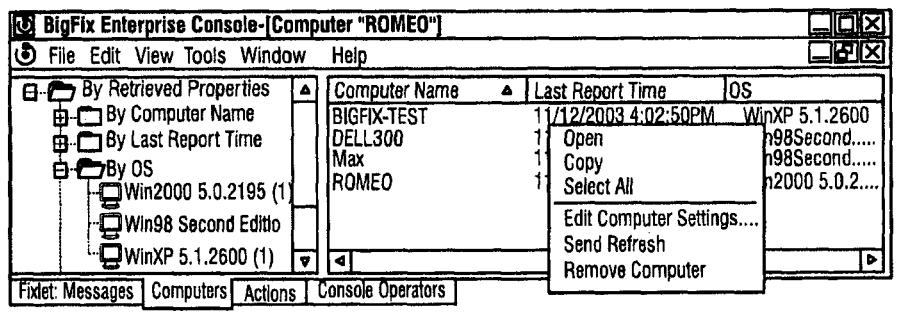
Figure 11:
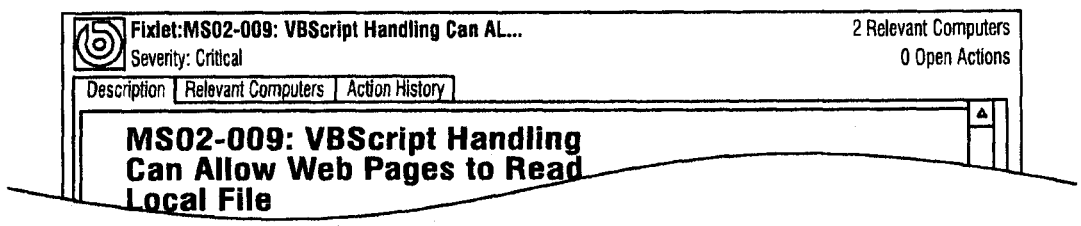
Figure 12:
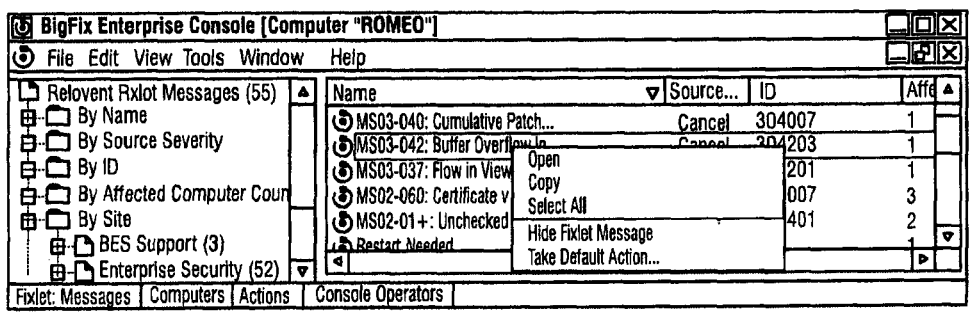
Figure 13:
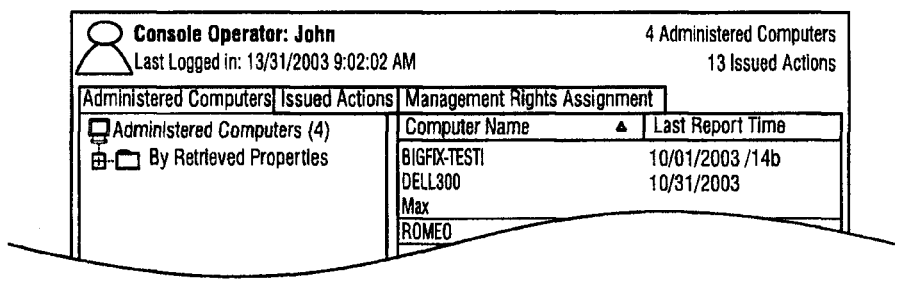
Figure 14:
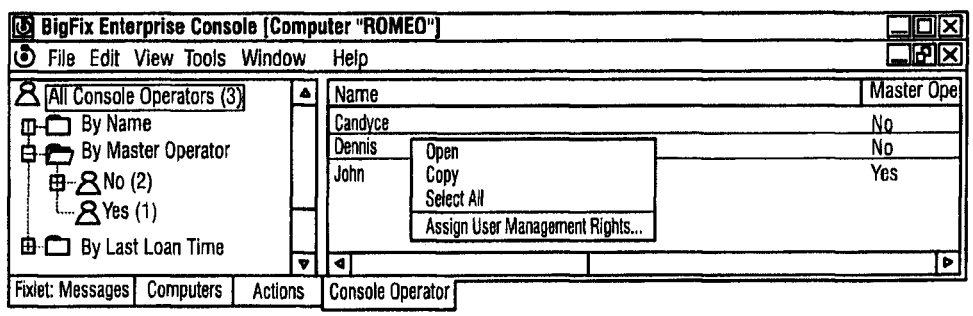

The Console Operators tab displays all the Console operators authorized for the network, which one can select for individual viewing. When one clicks on the Console Operators tab, one sees a filter/list, as shown in FIG. 14. This screenshot shows the filter panel on the left, the list on the right, and the right-click menu. Select an item from the filter panel on the left to filter the operator list. One can sort the list by clicking on the desired column header. Click again to change from ascending to descending order. The default column headings are:

Name: The name of the Console operator, as originally authorized.

Master Operator: This is a yes or no field indicating whether a given operator has master privileges.

Last Login Time: Records the last time this operator logged in to the Console.

The right-click menu has these options:

Open: Open this operator record for more information in the Operator document area below.

Copy: Copy this info to the clipboard for pasting into a text box, such as notepad or wordpad.

Select All: Select all the operators in this list

Assign User Management Rights: Select this option to assign new management rights to the given operator.

To learn more about a Console operator, double-click on a name from the list or right-click and choose Open from the pop-up menu. That brings up a Console Operator document in the work area below.

This dialog is available by clicking on the Console Operators tab, selecting View>Console Operators or pressing the F12 key.

Preferences

The Preferences dialog lets one adjust certain system-wide parameters:

Fixlet List

Refresh list every XX seconds: Controls how often the Fixlet display is updated. The default setting causes the Database to be queried every 15 seconds. More frequent updates cause more the network traffic, but less frequent updates increase the response time. As the Database increases in size, a longer refresh rate may be desirable. In practice, 15 seconds provides a good balance between latency and bandwidth concerns.

Client Computers

Send heartbeat every XX minutes: Controls how often the Client computers check in with the Server to update their status. Each time a Client sends a heartbeat, it includes any retrieved property values which have changed. 15 minutes is the default value.

Mark as offline after XX minutes: Controls how long to wait after the last heartbeat before a computer is declared to be offline. The default is 50 minutes.

Cache options

Store cache on disk between sessions: By saving the locally-cached data, one can shorten startup times.

Reload cache from database for each session: When one reload the cache from the database, one get fresh data but longer load times.

This dialog is available by selecting:•File>Preferences

Retrieved Properties

The Retrieved Properties dialog contains a list of computer properties retrieved from each Client. This list forms the basis of all client listings in the Console. These properties are used as column headers whenever the client computers are listed. In addition, these properties are used to target or filter computers for Fixlet messages or actions.

There are several properties listed as defaults in the top panel, but one can add to these and delete the optional ones by using the buttons on the right:

Add New: To add a property, click this button, supply a name (for filtering and sorting) and then fill in a Relevance Expression in the text box below.

Delete: To delete a property, highlight it in the list and then click this button.

Rename: To rename a property, highlight it in the list, click this button and then type a new name for the property in the list window.

Relevance: This text box displays the relevance expression that is evaluated to produce the retrieved property.

If one change any of the pre-installed properties, one can restore them by re-entering the appropriate relevance expressions. See Restoring Column Headings.

Some of the properties (such as the ID and the relay status) are essential to the proper functioning of the Console, and may not be renamed or deleted.

This dialog is available two ways:

Tools>Define Retrieved Properties . . .

Right click in the column header of any Client listing

Site Properties

The Site Properties dialog displays information about the selected Fixlet site, including details about the Site publisher and the precise URLs from which the content has been gathered. The dialog box shows e-mail addresses for user feedback and the recommended gather frequency. For instance, a typical Fixlet site may have a daily subscription and be signed by both a signing authority and a software or hardware vendor.

SiteName: Name of the selected Fixlet site.

Organization: The name of the company that manages the Fixlet site.

From: E-mail address of the manager of this Fixlet site.

Subject: A description of the Fixlet site.

Website: The Website of the company that authors this Fixlet site.

Organization Common Name: The name of the company that authors this Fixlet site.

BBS: The URL of a bulletin board supporting this site.

Gather URL: The URL of the Fixlet site.

Update Frequency: The frequency for gathering fresh Fixlet messages from this site.

Date: A date attached to this site.

Description: A short description of the Fixlet site.

This dialog is available by selecting: •Tools>Manage Sites . . . >Select a site>Properties button.

Take Action

The Take Action dialog. When one click on an action button, this dialog pops up, letting one specify exactly how the selected actions are to be deployed to the computers on the network. It contains four tabs:

Target: Lets one specify subgroups of Clients to target with the selected actions. One can select computers based on retrieved properties—including own custom properties.

Message: Specify some interactions that may take place with the end user before the action is executed.

Constraints: Filter, schedule and specify whether a user is needed to help apply the action.

Execution: Set up retry counts for execution and failure, and set client to reboot if necessary.

Action Script: Review the action script, or customize own script.

Relevance: Typically, an issue is considered fixed when the Fixlet message is no longer relevant, meaning the problem can no longer be detected. This tab lets one use different criteria to determine when a problem has been fixed.

When one decide to take an action, click OK. One needs to enter a password before the Console issues the action. When one do, a progress dialog pops up to keep one posted on the deployment. This dialog is available by opening a Fixlet message from any list and then clicking on an action button.

Take Action: Constraints

The Constraints tab of the Take Action dialog lets one schedule actions, specify whether the user is needed and filter certain computers.

Schedule: Set up expirations and blocks of time for execution.

Expire Action XX days from now: If this button is checked, the action expires in the given number of days. After the expiration date, the action is no longer applied, even if the Fixlet message becomes relevant again.

Run between HH:MM and HH:MM: Check this box to define a block of time when the current action can be executed.

Run between HH:MM and HH:MM: Check this box to define a second block of time when the current action can be executed.

User: Define whether a user should be present or not.

Run only when a user is present: Execute action only when a user is present. This might be desired when the action requires user feedback or intervention.

Run only when no user is present: Execute the action only in the absence of a user. This might be desired for long installs that might happen overnight, but only on unoccupied clients.

Run independent of user presence: Execute the action whether a user is present or not. This might be useful for critical patches or small, silent updates.

Computer: Select a subset of computers for the action.

Run only when [Property] [Operator] [Value]: Check this box when one want to filter the Clients by their retrieved properties. Select a Property and an Operator from the pull-down menus, then select a value for comparison. The value entered must form a valid relevance expression.

This dialog is available by selecting a Fixlet message from any list, then clicking an action button. From the Take Action dialog, select the Constraints tab.

Take Action: Execution

The Execution tab of the Take Action dialog. When an action becomes relevant, this dialog lets one adjust how often it are applied, how to deal with failure and whether or not to reboot the Client after the action is applied.

Automated Application: Schedule the execution of the action.

If the Fixlet message becomes relevant again after this action has successfully executed, automatically reapply this action. Check this box to keep reapplying this action whenever it becomes relevant.

Limit to XX reapplications: Continue to apply the action a limited number of times, as long as it is still relevant. If an action becomes repeatedly relevant, it might be a sign that a user needs special handling. This limits a Client to a certain number of attempts (the default is 3) before quitting.

Retries: Set the number of retries if an action fails to execute.

On failure, retry XX times: Check this box to retry the action in case of a failure. If an action fails, it may be that the user dismissed it or that the computer crashed or was otherwise unable to execute the action. Select a number of retry attempts (the default is 3). and then select a condition for trying again from the choices below:

Wait XX between attempts: This button lets one select a period of time to wait before retrying the action (the default is one hour).

Wait until computer has rebooted: Select this button to wait until the Client reboots before trying to execute the action again.

Post-Action: After the action executes, do the following:

Do nothing after action completes. This is the default—after execution, simple resume normal operation.

Restart computer after action completes: Often a downloaded program or patch requires the computer to be rebooted. Check this box to automatically reboot the computer after an action is executed.

Force restart after XX seconds. This option allows a waiting period before restarting the computer. A countdown dialog appears on the Client to warn the user of the impending restart.

Shutdown computer after action completes: This causes the Client to shut down after an installation.

Force shutdown after XX seconds. This option allows a waiting period before shutting down the computer. A countdown dialog appears on the Client to warn the user of the impending shutdown.

Temporal Distribution: Spaces out the execution of actions to reduce the hit to the network.

Distribute execution of the action over MM minutes to reduce the network load: By checking this box, one can force the program to space out the execution of actions. This can be useful to reduce the load on the network in the case of bandwidth-intensive actions. It is especially useful for allowing Relays to effectively service hundreds of attached Clients.

This dialog is available by selecting a Fixlet message from any list, then clicking an action button. From the Take Action dialog, select the Execution tab.

Take Action: Message

The Message tab of the Take Action dialog. Ordinarily, the system applies actions in the background, without bothering any end user who may be present. There are, however, occasions in which the Console operator might prefer that the action be taken only with end-user involvement. The Message tab in the Take Action dialog box allows the operator to require that an active user be present when the action is run, to alert the user with a specific message, and to offer certain interactive features on the message display, including the ability to see more information about the proposed action and to cancel the proposed action.

Display message before running action: Check this box if one want to deliver a message. When this box is checked, two boxes are opened for text entry:

Message Title: Type a title line for message.

Message Text: Type message in this text box.

Message Buttons: One can supply one or two optional buttons:

View Action Script: If this box is checked, the client message contains a button allowing the user to see what the action does before he commits.

Cancel: If this box is checked, the client message contains a button allowing the user to cancel out of the action. If one check the button above, one should also add a cancel button.

This dialog is available by selecting a Fixlet message from any list, then clicking an action button. From the Take Action dialog, select the Message tab.

Take Action: Relevance

The Relevance tab of the Take Action dialog lets one determine what criteria are used to judge when a computer is considered to be fixed. Typically, the original Fixlet is designed to trigger only when it becomes relevant to the given computer. Fixing the problem also deactivates the trigger, so the Fixlet is no longer relevant (it becomes FALSE). In other words, a computer is considered to be fixed when the Fixlet no longer applies. That is the automatic solution and is the default setting (top button).

There may be reasons to specify different criteria. provides three options:

Consider a computer to be "Fixed" when:

The action script was run, and the original Fixlet Message relevance expression is FALSE. This is the default action, and the one most recommended.

All lines of the action script have been completed. In certain circumstances, it may be more reasonable to consider that a computer is not fixed until the action has finished executing its last line.

The action script was run, and the following relevance expression is FALSE. Select this option if one want to use own relevance statement to determine when a computer is fixed. Type a relevance statement into the text box below.

This dialog is available by selecting a Fixlet message from any list, then clicking an action button. From the Take Action dialog, select the Relevance tab.

Take Action: Action Script

The Action Script tab of the Take Action dialog lets one improvise own action scripts. We highly recommend that one use the action scripts that come with each Fixlet. But should one want to customize the scripts for any reason, one can do it here. There are two buttons in this dialog:

Use the action script specified in the Fixlet message: This is the default for most Fixlet actions, and is the recommended option.

Use the following action script: If one opted to create a custom action script when one deployed this action, this button are selected, and the following two items determine the course of the action.

Action Script Type: The type of action script one want to use for this script:

Action Script: This is the standard scripting language for actions.

AppleScript: This is Apple's scripting language for controlling computer resources.

sh: indicates that the action is a shell script, intended to be run by a Linux/UNIX/bsd shell.

New Action Type: When one select this option, one are presented with a dialog prompting one to provide a Name and a MIME type for script.

Action Script: Type action script into this text box. The default is the prepackaged action that came with the Fixlet message that one can modify, or enter an entirely new script. Scripting is powerful and can have huge ramifications. Make sure to test action on a small scale before one deploy it on entire the network! This dialog is available by selecting a Fixlet message from any list, then clicking an action button. From the Take Action dialog, select the Action Script tab.

Take Action: Target

The Target tab of the Take Action dialog. When an action is relevant, the Console operator can select, or target, a subset of users to receive the action. There are two radio buttons at the top of this dialog:

Specific Computers selected in the list below. When one select this button, only those Clients highlighted in the computer list receives the actions. This is the default behavior.

Note that one can filter this computer list by selecting items from the tree view in the left panel. Once one click OK, the selection of computers in this list are frozen—the retrieved values is not reevaluated before the action is deployed. Thus, if a computer is affected by this problem in the future, it is not covered by this option. It triggers the same Fixlet, but requires one to target it again.

All Computers with the Retrieved Properties values selected in the tree below. This button causes continued evaluation of Client computers for relevance if they match the selected properties. Unlike the scenario described above, if a new computer is affected by this problem in the future, it are automatically updated. One may also filter this set of relevant computers using the retrieved property panel on the left. Because of the open-ended nature of this function, one should use the constraints tab to define an expiration date.

These options grant one great power in the deployment of Fixlet actions. Think carefully about choices here. The first button is the safest, since it describes a static set of computers that one wishes to target. The second choice is more powerful, because it continues to evaluate and automatically deploy relevant actions, but it could also have long-term consequences that one should consider.

This dialog is available by selecting a Fixlet message from any list, then clicking an action button. From the Take Action dialog, select the Target tab.

View Action Info

The View Action Info dialog displays information on a specific action for a given computer.

Started at: The starting date and time for the selected action.

Completed at: The date and time that the selected action completed executing.

Execution details: Displays a scrolling window of information about the status, timing, retries and details about each step in the execution of the action.

This dialog is available from any action document in the bottom panel. Select the Reported Computers tab, right-click on a computer and select Show Action Info from the pop-up menu (or select Show Action Info from the Edit menu). One can also open this dialog from the Action History tab of any Computer document.

View Web Reports

The View Web Reports dialog. This dialog provides access to Web reports which are collected from various Servers and aggregated into a set of HTML reports. These include summaries of the history and status of Fixlet messages and Actions across extended the networks of computers. These reports can be used to track software deployments and compliance across a global the network of independent LANs.

To view a Web report, select a Server URL and click the Launch Web Reports button.

This dialog is available by selecting:

Tools>View Web Reports

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

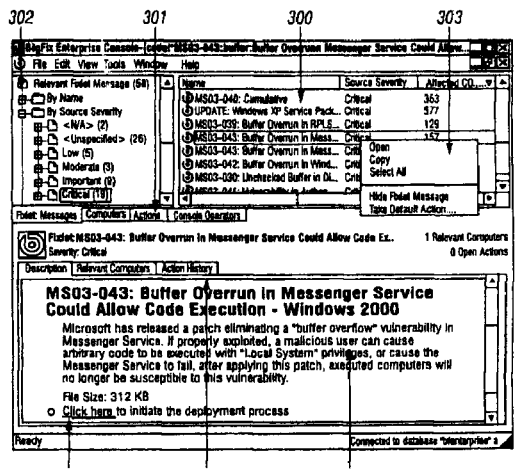

The invention claimed is:

1. In a system for formalizing, diffusing, and enforcing policy advisories and for monitoring policy compliance in the management of a network of computational devices, said system comprising a plurality of distributed clients, each of which runs on a corresponding networked computational device, an apparatus comprising:

an enterprise console comprising a centrally managed advisory diffusion mechanism and a protocol for diffusing said advisories across said network of computational devices;

a plurality of advisories specifying relevance criteria and an action, at least one advisory describing a problem that has been discovered on a client computational device;

wherein said distributed clients running on said associated computational devices gather said advisories and process said advisories; and wherein each of said distributed clients, each running on an associated computational device, determines relevance of an advice message by evaluating a relevance clause of said advice message, while automatically retrieving properties of the computational device on which said client runs;

wherein said advisories formally target specific states of a computational device associated with a client running thereon and formally specify actions to take in response thereto;

wherein said client implements associated actions received from said console.

2. The apparatus of claim 1, said system further comprising:

a central server coupled to a central database, said central server storing data in and retrieving data from said central database.

3. The apparatus of claim 1, wherein said relevance clause is written in a formal descriptive language; and wherein said advisory comprises a short, clear explanation of said problem.

4. The apparatus of claim 3, further comprising:

means for adding, modifying, or canceling a subscription of a distributed client to one or more advice provider sites.

5. The apparatus of claim 4, further comprising:

means for selecting a group of computational devices, specifying action messages, scheduling, and controlling execution when deploying actions proposed by relevant advice messages.

6. The apparatus of claim 5, further comprising:

means for securely deploying actions of relevant advice messages to a selected group of said distributed clients.

7. The apparatus of claim 6, further comprising:

means for monitoring status of deployed actions.

8. The apparatus of claim 7, further comprising:

means for stopping previously deployed actions which have not finished running.

9. The apparatus of claim 8, further comprising:

means for monitoring status of each computational device while actions are being deployed and executed.

10. The apparatus of claim 9, wherein said means for monitoring allows said system administrator to define and retrieve customized properties of computational devices using a formal descriptive language.

11. An enterprise management apparatus, comprising:

a centrally managed advisory diffusion server for gathering advisories from an advisory site, wherein an advisory comprises relevance criteria and an action, and wherein an advisory identifies relevant computers on a network of computational devices and allows authorized personnel to monitor, modify, and maintain said computers across any subset of said network;

a console in communication with said server for displaying any of changes and new knowledge about said network of computational devices; and a plurality of clients, each running on an associated computational device, associated with said network of computational devices, each client processing said advisories based upon a relevance determination, inspecting said associated computational device, and reporting any relevance determination and actions to said server;

wherein each of said clients, each running on an associated computational device, determines relevance of an advice message by evaluating a relevance clause of said advice message, while automatically retrieving properties of the computational device on which said client runs;

wherein said client implements associated actions received from said console.

12. The apparatus of claim 11, further comprising:

a plurality of relays for relaying said advisories to said clients and for receiving related data from said client to forward to said server.

13. The apparatus of claim 11, said console further comprising:

means for a console operator to target patches or other fixes to appropriate computers when vulnerabilities are discovered.

14. The apparatus of claim 13, said console further comprising:

means for following progress of said patches or fixes in near real-time as they spread to all relevant computers and, one by one, eliminate bugs and vulnerabilities for affected computers across said network.

15. The apparatus of claim 11, further comprising:

means for keeping a running history of any and all remedial actions taken with regard to said computers.

16. The console of claim 11, further comprising:

means for providing a detailed audit trail for every action and every maintained computer on said network.

17. In a network comprising a plurality of managed computers, an enterprise management apparatus, comprising:

a console for providing a system-wide view of said network of managed computers, along with specific characteristics of each computer and associated actions and for distributing information only to those computers for which said information is relevant;

a client running on and associated with each managed computer for accessing a collection of messages comprising said information, which messages identify relevant computer characteristics, wherein if said characteristics are identified, said client running on and associated with a computer implements associated actions received from said console on said associated computer, wherein each client determines relevance of a message by evaluating a relevance clause of said message, while automatically retrieving properties of the managed computer on which said client runs; and a server for coordinating information flow to and from individual clients, each client running on and associated with a networked computer, and for storing results in a database.

18. The apparatus of claim 17, further comprising:

a relay for offloading said server, wherein a plurality of clients point to a relay for downloads, which in turn makes only a single request of said server.

19. The apparatus of claim 18, wherein a plurality of inter-accessible relays are provided.

20. The apparatus of claim 17, further comprising:

a report module for maintaining an audit trail of all console activity on said network.

21. The apparatus of claim 17, further comprising:

a filter panel for providing a set of folders that contains specific field values to focus console activity.

22. The apparatus of claim 17, wherein each message describes a problem that has been discovered on a client, and a short, clear explanation of said problem.

23. The apparatus of claim 17, further comprising:

a human-readable relevance language for said messages that provides expressions for querying an exhaustive set of computer properties to target actions only to those computers matching predetermined relevance criteria.

24. In a system for formalizing, diffusing, and enforcing policy advisories and for monitoring policy compliance in the management of a network of computational devices, said system comprising a plurality of distributed clients, each of which runs on a corresponding networked computational device, and a server for coordinating information flow to and from individual clients, an apparatus comprising:
at least one relay for offloading a download burden from said server, wherein said clients download from a designated relay;
wherein said server distributes each advisory once to said relay, which in turn distributes said advisory to said clients; and
wherein overhead on said server is reduced by a ratio of relays to clients.

25. The apparatus of claim 24, wherein for each client in said network, both a primary and a secondary relay are specified.

26. The apparatus of claim 25, wherein each client first attempts to download from its primary relay; and wherein if said primary relay is unavailable for a client, said client can download from said secondary relay.

27. The apparatus of claim 25, wherein if said primary relay fails, said secondary relay becomes a primary relay.

28. The apparatus of claim 27, wherein if said secondary also fails, said client automatically downloads directly from said server.

29. In a system for formalizing, diffusing, and enforcing policy advisories and for monitoring policy compliance in the management of a network of computational devices, said system comprising a plurality of distributed clients, each of which runs on a corresponding networked computational device, a method comprising the steps of:
providing a centrally managed advisory diffusion mechanism and a protocol for diffusing said advisories across said network of computational devices;
providing a plurality of advisories specifying relevance criteria and an action, at least one advisory describing a problem that has been discovered on a client computational device, said advisory comprising a short, clear explanation of said problem;
wherein said distributed clients, each client running on and associated with a networked computational device, gather said advisories and process said advisories;
each of said distributed clients determining relevance of an advice message by evaluating a relevance clause of said advice message, while automatically retrieving properties of the computational device on which said client runs and with which it is associated; and
wherein said advisories formally target specific states of a computational device and formally specify actions to take in response thereto.

30. The method of claim 29, further comprising the step of:
providing a central server coupled to a central database, said central server storing data in and retrieving data from said central database.

31. the method of claim 29, wherein said relevance clause is written in a formal descriptive language.

32. The method of claim 31, further comprising the step of:
any of adding, modifying, and canceling a subscription of a distributed client to one or more advice provider sites.

33. The method of claim 32, further comprising the step of:
selecting a group of computational devices, specifying action messages, scheduling, and controlling execution when deploying actions proposed by relevant advice messages.

34. The method of claim 33, further comprising the step of:
securely deploying actions of relevant advice messages to a selected group of said distributed clients.

35. The method of claim 33, further comprising the step of:
monitoring status of deployed actions.

36. The method of claim 35, further comprising the step of:
stopping previously deployed actions which have not finished running.

37. The method of claim 36, further comprising the step of:
monitoring status of each computational device while actions are being deployed and executed.

38. The method of claim 37, wherein said monitoring step allows said system administrator to define and retrieve customized properties of computational devices using a formal descriptive language.

39. An enterprise management method, comprising the steps of:
gathering advisories from an advisory site with a centrally managed advisory diffusion server, wherein each advisory comprises relevance criteria and an action, and wherein each advisory identifies relevant computers on a network and allows authorized personnel to monitor, modify, and maintain said computers across any subset of said network;
displaying any of changes and new knowledge about said network with a console in communication with said server; and
providing a plurality of clients, each client associated with and running on a networked computational device, associated with said network, each client processing said advisories based upon a relevance determination, inspecting its associated computer, and reporting any relevance determination and actions to said server.

40. The method of claim 39, further comprising the step of:
relaying said advisories to said clients and receiving related data from said client to forward to said server with a plurality of relays.

41. The method of claim 39, said console further comprising the step of:
a console operator to target patches or other fixes to appropriate computers when vulnerabilities are discovered.

42. The method of claim 41, said console further comprising the step of:
following progress of said patches or fixes in near real-time as they spread to all relevant computers and, one by one, eliminate bugs and vulnerabilities for affected computers across said network.

43. The method of claim 41, further comprising the step of:
keeping a running history of any and all remedial actions taken with regard to said computers.

44. The method of claim 41, further comprising the step of:
providing a detailed audit trail for every action and every maintained computer on said network.

45. An enterprise management method for a network comprising a plurality of managed computers, comprising the steps of:
providing a system-wide view of said network of managed computers, along with specific characteristics thereof and associated actions, and for distributing information only to those computers for which said information is relevant;

providing a client running on and associated with each managed computer for accessing a collection of messages comprising said information that identify relevant computer characteristics, wherein if said characteristics are identified, said client implements associated actions received from said console, wherein each of said clients determines relevance of a message by evaluating a relevance clause of said message, while automatically retrieving properties of the computer on which said client runs; and coordinating information flow to and from individual clients and for storing results in a database.

46. The method of claim 45, further comprising the step of:

offloading said server with a relay, wherein a plurality of clients point to a relay for downloads, which in turn makes only a single request of said server.

47. The method of claim 46, wherein a plurality of inter-accessible relays are provided.

48. The method of claim 45, further comprising the step of:

maintaining an audit trail of all console activity on said network.

49. The method of claim 45, further comprising the step of:

providing a set of folders that contains specific field values to focus console activity.

50. The method of claim 45, wherein each message describes a problem that has been discovered on a client, and a short, clear explanation of said problem.

51. The method of claim 45, further comprising the step of:

providing a human-readable relevance language for said messages that provides expressions for querying an exhaustive set of computer properties to target actions only to those computers matching predetermined relevance criteria.

52. In a system for formalizing, diffusing, and enforcing policy advisories and for monitoring policy compliance in the management of a network of computational devices, said system comprising a plurality of distributed clients, each of which is associated with and runs on a corresponding networked computational device, and a server for coordinating information flow to and from individual clients, a method comprising the steps of:

offloading a download burden from said server with a relay, wherein said clients download from a designated relay;

said server distributing each advisory once to said relay, which in turn distributes said advisory to said clients; and reducing overhead on said server a ratio of relays to clients.

53. The method of claim 52, wherein for each client in said network, both a primary relay and a secondary relay are specified.

54. The method of claim 53, wherein each client first attempts to download from its primary relay; and wherein if said primary relay is unavailable for a client, said client can download from said secondary relay.

55. The method of claim 53, wherein if said primary relay fails, said secondary relay becomes a primary relay.

56. The method of claim 55, wherein if said secondary relay also fails, said client automatically downloads directly from said server.

57. In a system for formalizing, diffusing, and enforcing policy advisories and for monitoring policy compliance in the management of a network of computational devices, said system comprising: a plurality of distributed clients, each of which is associated with and runs on a corresponding networked computational device, a server for coordinating information flow to and from individual clients, and a plurality of relays, each of which aggregates and mediates communication between said distributed clients and said server, an apparatus comprising:

means associated with each said client for evaluating a relevance clause; identifying a file or group of files to upload to said server from its associated computational device;

means associated with each said client for aggregating a file or group of files resident on its associated computational device into a file collection;

wherein a relay offloads an upload burden from said server; and wherein said clients upload said file collection to said server via a designated relay; and means associated with each said client for distributing each file collection once to said relay, which in turn distributes said file collection to said server.

58. The apparatus of claim 57, said system further comprising:

a central server coupled to a repository of files, said server storing, data in, and retrieving data from, said repository of files.

59. The apparatus of claim 57, wherein said client compresses said file collection to reduce said collection's data size.

60. The apparatus of claim 57, wherein said client distributes each file collection periodically to said relay, which in turn distributes said files to said server.

61. The apparatus of claim 57, wherein said client does not include files in a file collection that have not changed since a previous file collection continuing said files was uploaded.

62. The apparatus of claim 57, further comprising:

means for limiting bandwidth consumed by said client during upload of said file collection to said relay.

63. The apparatus of claim 57, further comprising:

means for limiting bandwidth consumed by said relay during upload of said file collection to said server.

64. The apparatus of claim 57, further comprising:

means for resuming an interrupted upload of said file collection by said client to said relay at a point of interruption.

65. The apparatus of claim 57, further comprising:

means for resuming an interrupted upload of said file collection by said client to said relay at a point of interruption.

* * * * *

UNITED STATES PATENT AND TRADEMARK OFFICE
CERTIFICATE OF CORRECTION

PATENT NO. : 7,398,272 B2
APPLICATION NO. : 10/804799
DATED : July 8, 2008
INVENTOR(S) : David Salim Hindawi et al.

It is certified that error appears in the above-identified patent and that said Letters Patent is hereby corrected as shown below:

Delete the title page showing an illustrative figure and substitute the attached title page therefor.

Delete drawing sheets containing figures 3-14, and substitute the attached drawing sheets containing figures 3-14 therefor.

PAGE 1
  - Replace drawing of FIGURE 3 with --- Replacement Sheet of FIGURE 3

Figure 4:
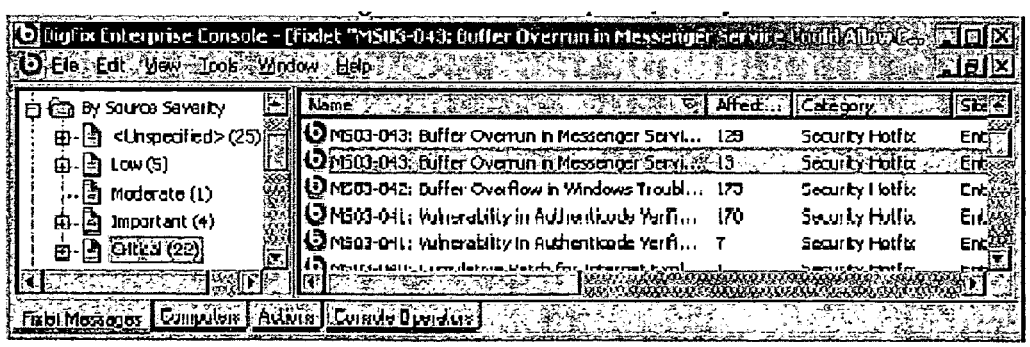
FIG. 4 is a screen shot showing an enterprise console window at the start of a sample session according to the invention.

PAGE 5
  - Replace drawings of FIGURES 3 and 4 with --- Replacement Sheets of FIGURES 3 and 4

Figure 5:
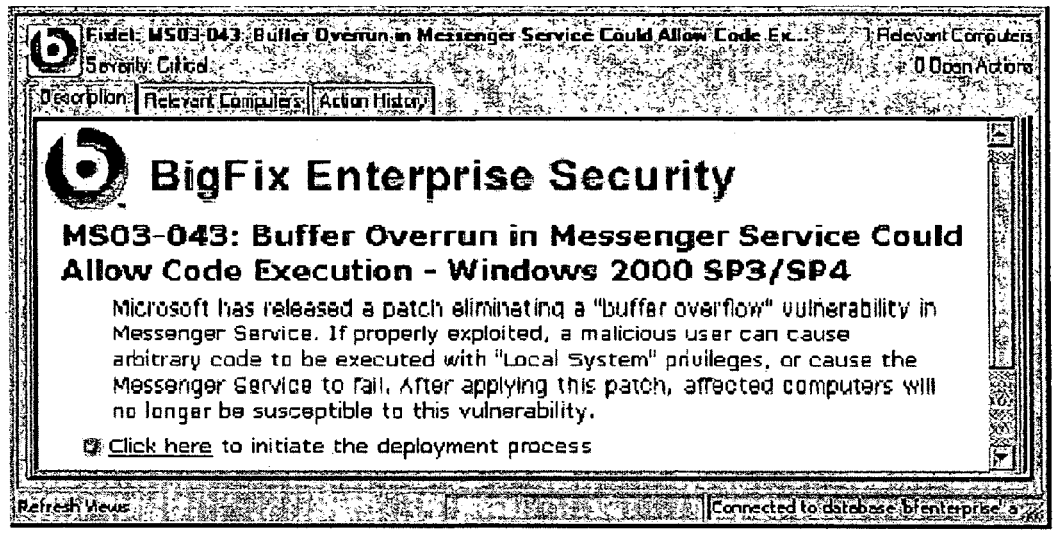
FIG. 5 is a screen shot showing a Fixlet panel during a sample session according to the invention.
Figure 6:
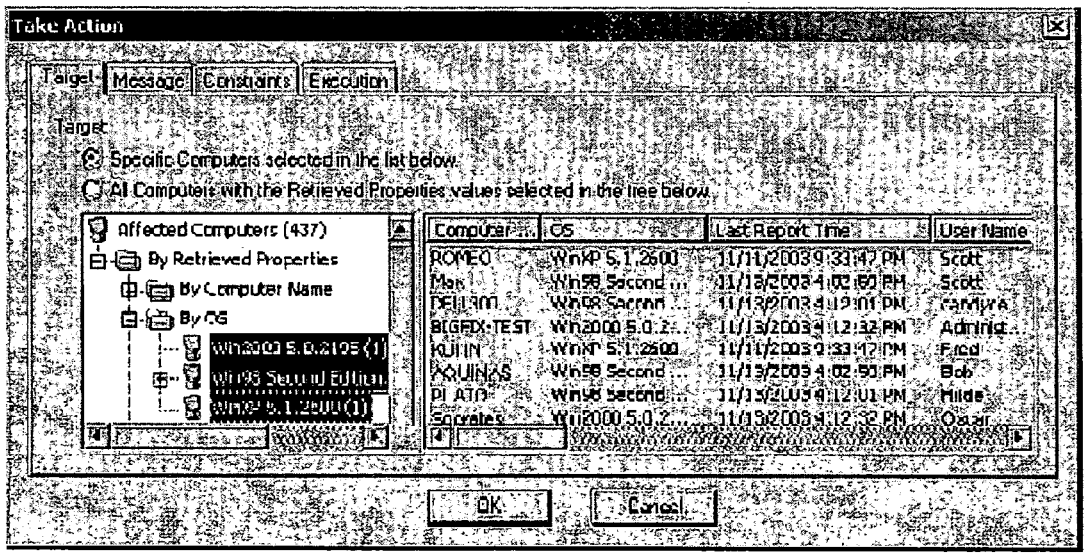
FIG. 6 is a screen shot showing a Take Action dialog box during a sample session according to the invention.

PAGE 6
  - Replace drawings of FIGURES 5 and 6 with --- Replacement Sheets of FIGURES 5 and 6

Figure 9:
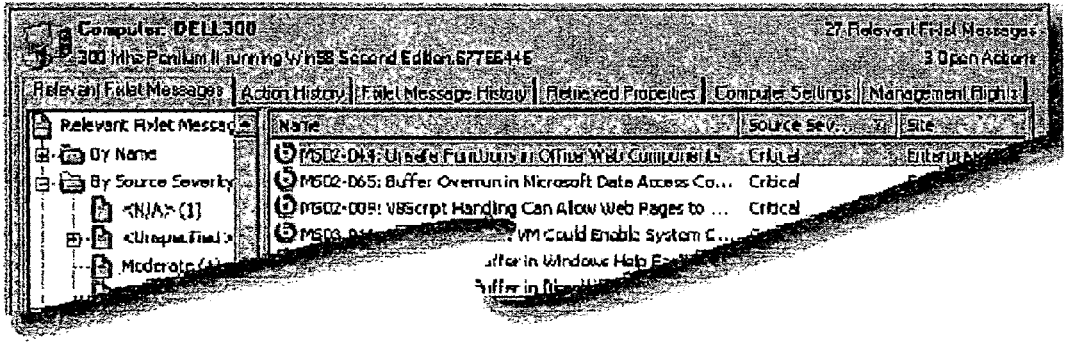
FIG. 9 is a screen shot showing a Computer document during a sample session according to the invention.

PAGE 7
  - Replace drawings of FIGURES 7, 8, and 9 with --- Replacement Sheets of FIGURES 7, 8, and 9

Figure 11:
FIG. 11 is a screen shot showing a Fixlet document during a sample session according to the invention.
Figure 12:
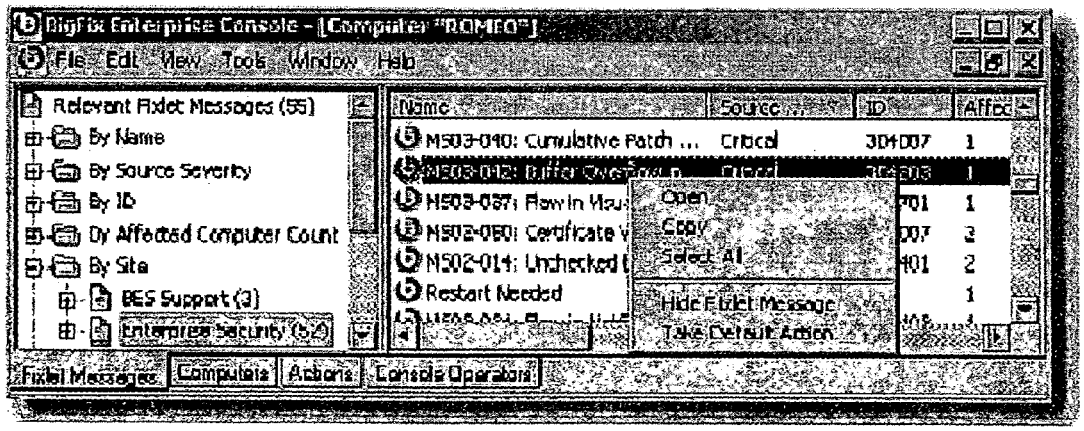
FIG. 12 is a screen shot showing Fixlet Messages tab filter/list during a sample session according to the invention.

PAGE 8
  - Replace drawings of FIGURES 10, 11, and 12 with --- Replacement Sheets of FIGURES 10, 11, and 12

Figure 13:
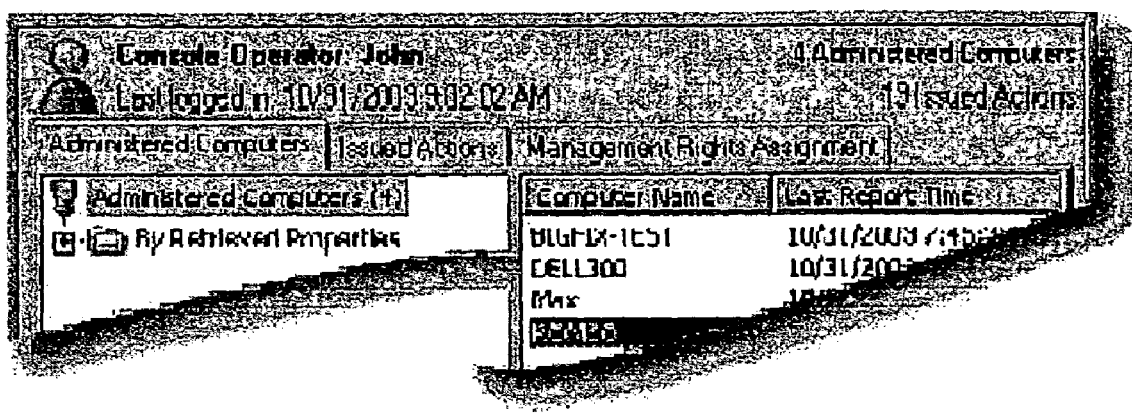
FIG. 13 is a screen shot showing a Console Operator document during a sample session according to the invention.

PAGE 9
  - Replace drawing of FIGURE 13 with --- Replacement Sheet of FIGURE 13

PAGE 10
  - Replace drawing of FIGURE 14 with --- Replacement Sheet of FIGURE 14

Signed and Sealed this

Twenty-fourth Day of August, 2010

David J. Kappos
*Director of the United States Patent and Trademark Office*

CERTIFICATE OF CORRECTION (continued)

(12) United States Patent
Hindawi et al.

(10) Patent No.: US 7,398,272 B2
(45) Date of Patent: Jul. 8, 2008

(54) ENTERPRISE CONSOLE

(75) Inventors: David Salim Hindawi, Berkeley, CA (US); David Leigh Donoho, Stanford, CA (US); Lisa Ellen Lippincott, Berkeley, CA (US); Dennis S. Goodrow, Santa Rosa, CA (US); James Milton Brown, Novato, CA (US); Peter Lincroft, Berkeley, CA (US); Peter Benjamin Loer, Oakland, CA (US); Orion Yosef Hindawi, Berkeley, CA (US)

(73) Assignee: Bigfix, Inc., Emeryville, CA (US)

( * ) Notice: Subject to any disclaimer, the term of this patent is extended or adjusted under 35 U.S.C. 154(b) by 462 days.

(21) Appl. No.: 10/804,799

(22) Filed: Mar. 19, 2004

(65) Prior Publication Data

US 2005/0086534 A1    Apr. 21, 2005

Related U.S. Application Data

(60) Provisional application No. 60/457,480, filed on Mar. 24, 2003.

(51) Int. Cl.
*G06F 17/30* (2006.01)

(52) U.S. Cl. .................. 707/10; 707/5; 709/203

(58) Field of Classification Search ............. 707/10, 707/104.1, 5; 709/203
See application file for complete search history.

(56) References Cited

U.S. PATENT DOCUMENTS

| | | | |
|---|---|---|---|
| 5,586,304 A | 12/1996 | Stupek, Jr. et al. | |
| 6,161,218 A | 12/2000 | Taylor | |
| 6,237,144 B1 | 5/2001 | Delo | |
| 6,240,394 B1 * | 5/2001 | Lecker et al. | 705/3 |
| 6,240,451 B1 | 5/2001 | Campbell et al. | |
| 6,256,668 B1 | 7/2001 | Slivka et al. | |
| 6,289,510 B1 | 9/2001 | Nakajima | |
| 6,321,258 B1 | 11/2001 | Stollfus et al. | |
| 6,324,691 B1 | 11/2001 | Gazdik | |
| 6,324,693 B1 | 11/2001 | Brodersen et al. | |
| 6,327,617 B1 | 12/2001 | Fawcett | |
| 6,330,715 B1 | 12/2001 | Razzaghe-Ashrafi | |
| 6,345,386 B1 | 2/2002 | Delo et al. | |
| 6,347,396 B1 | 2/2002 | Gard | |
| 6,347,398 B1 | 2/2002 | Parthasarathy et al. | |
| 6,353,926 B1 | 3/2002 | Parthesarathy et al. | |
| 6,353,928 B1 | 3/2002 | Altberg et al. | |
| 6,360,366 B1 | 3/2002 | Heath et al. | |
| 6,378,128 B1 | 4/2002 | Edelstein et al. | |

(Continued)

*Primary Examiner*—Cheryl Lewis
(74) *Attorney, Agent, or Firm*—Michael A. Glenn; Glenn Patent Group

(57) ABSTRACT

A console for an enterprise suite is disclosed. The enterprise suite addresses the increasingly complex problem of keeping critical systems updated, compatible, and free of security holes. It uses Fixlet® technology to identify vulnerable computers on the network and then allows authorized personnel to correct problems across any subset of the network with a few simple mouse-clicks. The enterprise suite helps keep the networked computers updated and properly patched, all from a central console which, along with supporting architectural enhancements, is the subject matter of this document. The invention allows rolling out a security patch in minutes instead of months, thus allowing an administrator to stay ahead of potential hacker attacks. The invention also makes it possible to track the progress of each computer as updates are applied, thus making it simple to gauge the level of compliance across the entire enterprise.

65 Claims, 8 Drawing Sheets